United States Patent
Shumate et al.

(10) Patent No.: US 12,517,338 B2
(45) Date of Patent: *Jan. 6, 2026

(54) ILLUMINATION DISPLAY AS ILLUMINATION SOURCE FOR MICROSCOPY

(71) Applicant: ETALUMA, INC., Carlsbad, CA (US)

(72) Inventors: Chris Shumate, Carlsbad, CA (US); Robert K. Levin, San Diego, CA (US); Eric Weiner, San Diego, CA (US)

(73) Assignee: ETALUMA, INC., Carlsbad, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 18/220,184

(22) Filed: Jul. 10, 2023

(65) Prior Publication Data
US 2023/0350182 A1    Nov. 2, 2023

Related U.S. Application Data

(63) Continuation of application No. 16/976,331, filed as application No. PCT/US2019/048582 on Aug. 28, 2019, now Pat. No. 11,740,447.

(Continued)

(51) Int. Cl.
*G02B 21/00* (2006.01)
*G02B 21/06* (2006.01)
(Continued)

(52) U.S. Cl.
CPC ............. *G02B 21/14* (2013.01); *G02B 21/26* (2013.01); *G02B 21/361* (2013.01)

(58) Field of Classification Search
CPC ............... G02B 21/00; G02B 21/0004; G02B 21/0008; G02B 21/0012; G02B 21/0016;
(Continued)

(56) References Cited

U.S. PATENT DOCUMENTS

| | | | |
|---|---|---|---|
| 4,852,985 A | 8/1989 | Fujihara et al. | |
| 4,948,258 A | 8/1990 | Caimi | |

(Continued)

FOREIGN PATENT DOCUMENTS

| | | | |
|---|---|---|---|
| CN | 102116927 A | 7/2011 | |
| CN | 103852878 A | 6/2014 | |

(Continued)

OTHER PUBLICATIONS

International Search Report and Written Opinion dated: Nov. 20, 2019, in International Patent Application No. PCT/US2019/048582 filed: Aug. 28, 219 and published as: W)/2020/047105 on Mar. 5, 2020.

(Continued)

*Primary Examiner* — Thong Q Nguyen
(74) *Attorney, Agent, or Firm* — Schmeiser, Olsen & Watts, LLP

(57) ABSTRACT

Microscope imaging and illumination systems and methods are included that may be used to image multiple specimens at different locations relative to a specimen fixture without the need for repositioning a source of illumination. In some cases, light patterns emitted from illumination screens may be repositioned and reconfigured electronically as needed (Continued)

with an illumination signal communicated to such illumination screens. Specialized microscope imaging techniques such as phase contrast microscopy may also be used with the systems and methods discussed herein.

14 Claims, 14 Drawing Sheets

Related U.S. Application Data

(60) Provisional application No. 62/724,579, filed on Aug. 29, 2018.

(51) Int. Cl.
*G02B 21/14* (2006.01)
*G02B 21/26* (2006.01)
*G02B 21/36* (2006.01)

(58) Field of Classification Search
CPC ............ G02B 21/0028; G02B 21/0032; G02B 21/0088; G02B 21/06; G02B 21/08; G02B 21/088; G02B 21/125; G02B 21/14; G02B 21/24; G02B 21/245; G02B 21/26; G02B 21/34; G02B 21/36; G02B 21/361; G02B 21/362; G02B 21/368
USPC ................................................. 359/368–398
See application file for complete search history.

(56) References Cited

U.S. PATENT DOCUMENTS

| | | | | |
|---|---|---|---|---|
| 5,239,178 | A | * | 8/1993 | Derndinger ............ G01B 9/04 250/234 |
| 6,704,447 | B2 | | 3/2004 | Sukthankar et al. |
| 7,663,691 | B2 | | 2/2010 | Ciudad et al. |
| 7,737,088 | B1 | * | 6/2010 | Stahler ................ G01N 21/253 536/25.31 |
| 8,084,753 | B2 | | 12/2011 | Joshi et al. |
| 8,089,691 | B2 | | 1/2012 | Arbuckle |
| 8,279,329 | B2 | | 10/2012 | Shroff et al. |
| 9,069,175 | B2 | | 6/2015 | Koebler et al. |
| 9,204,105 | B2 | * | 12/2015 | Fujimoto ............ G01N 21/253 |
| 9,443,310 | B2 | | 9/2016 | Hudman et al. |
| 9,453,995 | B2 | * | 9/2016 | Clark ..................... G02B 21/08 |
| 9,494,783 | B2 | | 11/2016 | Levin et al. |
| 11,740,447 | B2 | * | 8/2023 | Shumate ............... G02B 21/26 359/368 |
| 2004/0253742 | A1 | | 12/2004 | Affleck et al. |
| 2009/0256689 | A1 | * | 10/2009 | Nakaya .................. G09G 3/20 340/407.1 |
| 2016/0202460 | A1 | | 7/2016 | Zheng |
| 2016/0363753 | A1 | | 12/2016 | Todd et al. |
| 2021/0141203 | A1 | | 5/2021 | Shumate et al. |

FOREIGN PATENT DOCUMENTS

| | | | |
|---|---|---|---|
| CN | 105158887 | | 12/2015 |
| CN | 105158888 | A | 12/2015 |
| CN | 105158894 | * | 12/2015 |
| DE | 4231406 | | 3/1994 |
| DE | 10119615 | A1 | 10/2002 |
| DE | 102016117675 | A1 | 3/2018 |
| WO | WO 10/105015 | A2 | 9/2010 |
| WO | WO 20/047105 | | 3/2020 |

OTHER PUBLICATIONS

International Preliminary Report on Patentability dated: Mar. 2, 2021, in International Patent Application No. PCT/US2019/048582 filed: Aug. 28, 2019 and published as: WO/2020/047105 on Mar. 5, 2020.

European Search Report completed May 11, 2022, in European Patent Application No. EP19854771.3 filed: Aug. 20, 2019.
Corrected Notice of Allowance dated: Apr. 19, 2023, in U.S. Appl. No. 16/976,331, filed Aug. 27, 2020, and published as: 2021/0141203 on May 13, 2021.
Notice of Allowance dated: Apr. 12, 2023, in U.S. Appl. No. 16/976,331, filed Aug. 27, 2020, and published as: 2021/0141203 on May 13, 2021.
Barlow et al. "Quantization of widefield fluorescence images using structured illumination and image analysis software. Microscopy Research and Technique" 70: 76-84 (2007).
Bian et al., "illumination Control/Computational Imaging: Multimodal microscopy using a low-cost liquid crystal display", Oct. 13, 2015, Pennwell Corporation.
Chang et al. "Isotropic image in structured illumination microscopy patterned with a spatial light modulator". Optics Express 17:14710-14721 (2009).
Chasles et al., "Optimization and characterization of a structured illumination microscope". Optics Express 15: 16130-16140 (2007).
Debarre et al. "Adaptive optics for structured illumination microscopy." Optics Express 16: 9290-9305 (2008).
Ellis, G.W. (1988) An annular scan phase-contrast scanned aperture microscope (ASPSAM). Cell Motil. Cytoskeleton 10, 342.
Fiolka et al., "Simplified approach to diffraction tomography in optical microscopy." 2009 Opt. Exp. 17, 12407-12417.
Hirvonen et al., "Structured illumination microscopy of a living cell". European Biophysics Journal 38: 807-812 (2009).
Kam et al., "Modelling the application of adaptive optics to widefield microscope live imaging". Journal of Microscopy 226: 33-42 (2007).
Karadaglic et al., "Image formation in structured illumination wide-field fluorescence microscopy". Micron 39: 808-818 (2008).
Kempson, D.A. (1950) Low-power phase-contrast microscopy without a condenser. Quart. J. Microsc. Sci., s3-91, 109-110.
Langhorst et al., "Structure brings clarity: Structured illumination microscopy in cell biology", Biotechnology Journal 4: 858-865 (2009).
Maurer et al., (2008) "Phase contrast microscopy with full numerical aperture illumination". Opt. Express 16, 19821-19829.
Mazhar et al., "Structured illumination enhances resolution and contrast in thick tissue fluorescence imaging," Journal of Biomedical Optics, pp. 1-3 Jan./Feb. 2010, vol. 15:1.
Neil et al., "Method of obtaining optical sectioning by using structured light in a conventional microscope". Optics Letters 22: 1905-1907 (1997).
Neil et al., "Real time 3D fluorescence microscopy by two beam interference illumination". Optics Communications 153: 1-4 (1998).
Neumann et al., "Structured illumination for the extension of imaging interferometric microscopy." Optics Express 16: 6785-6793 May 12, 2008.
Oldenbourg, R. (1996) A new view on polarization microscopy. Nature 381, 811-812.PubMed (Nature access required of $32 for PDF).
Otaki, T. (2000) Artifact halo reduction in phase contrast microscopy using apodization. Opt. Rev. 7, 119-122.
Pavani et al., Quantitative structured-illumination phase microscopy. Applied Optics 47: 15-24 (2008).
Phillips et al., "Quantitative Optical Microscopy: Measurement of Cellular Biophysical Features with a Standard Optical Microscope," J Vis Exp. (86): 50988., Apr. 7, 2014.
Piper, J. (2007) Relief-phase-contrast—a new technique for phase-contrast light microscopy. Microsc. Anal.21(4), 9-12.
Piper, T. & Piper, J. (2012a) Axial phase-darkfield-contrast (APDC), a new technique for variable optical contrasting in light microscopy. J. Microsc. 247, 259-268.
Piper, T. & Piper, J. (2012b) Variable Phase-darkfield Contrast (VPDC)—a variant illumination technique for improved visualizations of transparent specimens. Microsc. Microanal. 18, 343-352.
Piper, T. & Piper, J. (2012c) Variable bright-darkfield-contrast, a new illumination technique for improved visualizations of complex structured transparent specimens. Microsc. Res. Tech. 75, 537-554.

(56) References Cited

OTHER PUBLICATIONS

Piper, T. & Piper, J. (2013a) Universal variable brightfield-darkfield contrast: a variant technique for improved imaging of problematic specimens in light microscopy. Microsc. Microanal. 19, 1092-1105.
Piper, T. & Piper, J. (2013b) Variable phase bright-field contrast (VPBC)—an attractive illumination technique for improved imaging in transparent specimens. Microsc. Microanal. 19, 11-21.
Poher et al., "Optical sectioning microscopes with no moving parts using a micro-stripe array light emitting diode". Optics Express 15: 11196-11206 (2007).
Reimann et al., "High-precision structural analysis of subnuclear complexes in fixed and live cells via spatially modulated illumination (SMI) microscopy" Chromosome Research (2008) 16:367-382.
Rheinberg, J. (2011) On an addition to the methods of microscopical research, by a new way optically producing colour-contrast between an object and its background, or between definite parts of the object itself. J. R. Microsc. Soc. 16, 373-388.
Schaefer et al. "Structured Illumination microscopy: Artifact analysis and reduction utilizing a parameter optimization approach". Journal of Microscopy 216: 165-174 (2004).
Shroff et al., "Phase-shift estimation in sinusoidally illuminated images for lateral superresolution". Journal of the Optical Society of America A26: 413-424 (2009).
Somekh et al., "Resolution in structured illumination microscopy: A probabilistic approach". Journal of the Optical Society of America A 25: 1319-1329 (2008).
Somekh et al., "Stochastic transfer function for structured illumination microscopy". Journal of the Optical Society of America A 26: 1630-1637 (2009).
Structured-light Wiki web page updated Jan. 19, 2021.
Structured light_3D_scanner Wiki web page updated May 6, 2021.
Webb et al. (2013) Condenser-free zernike phase contrast imaging for scanning probe microscopy. Microsc. Anal. 27, 27-32.
Webb, "Condenser-free contrast methods for transmitted-light microscopy," Journal of Microscopy, vol. 257, Issue 1 2015, pp. 8-22.
Wilson et al., "Real-time three-dimensional imaging of macroscopic structures". Journal of Microscopy 191: 116-118 (1998).
Woodford, "LCDs (liquid crystal displays)", printed from https//www.explainthatstuff.com/lcdtv.html Jul. 10, 2019.
Zheng et al., "Microscopy refocusing and dark-field imaging by using a simple LED array", Optics Letters, Oct. 15, 2011, vol. 36, No. 20.

\* cited by examiner

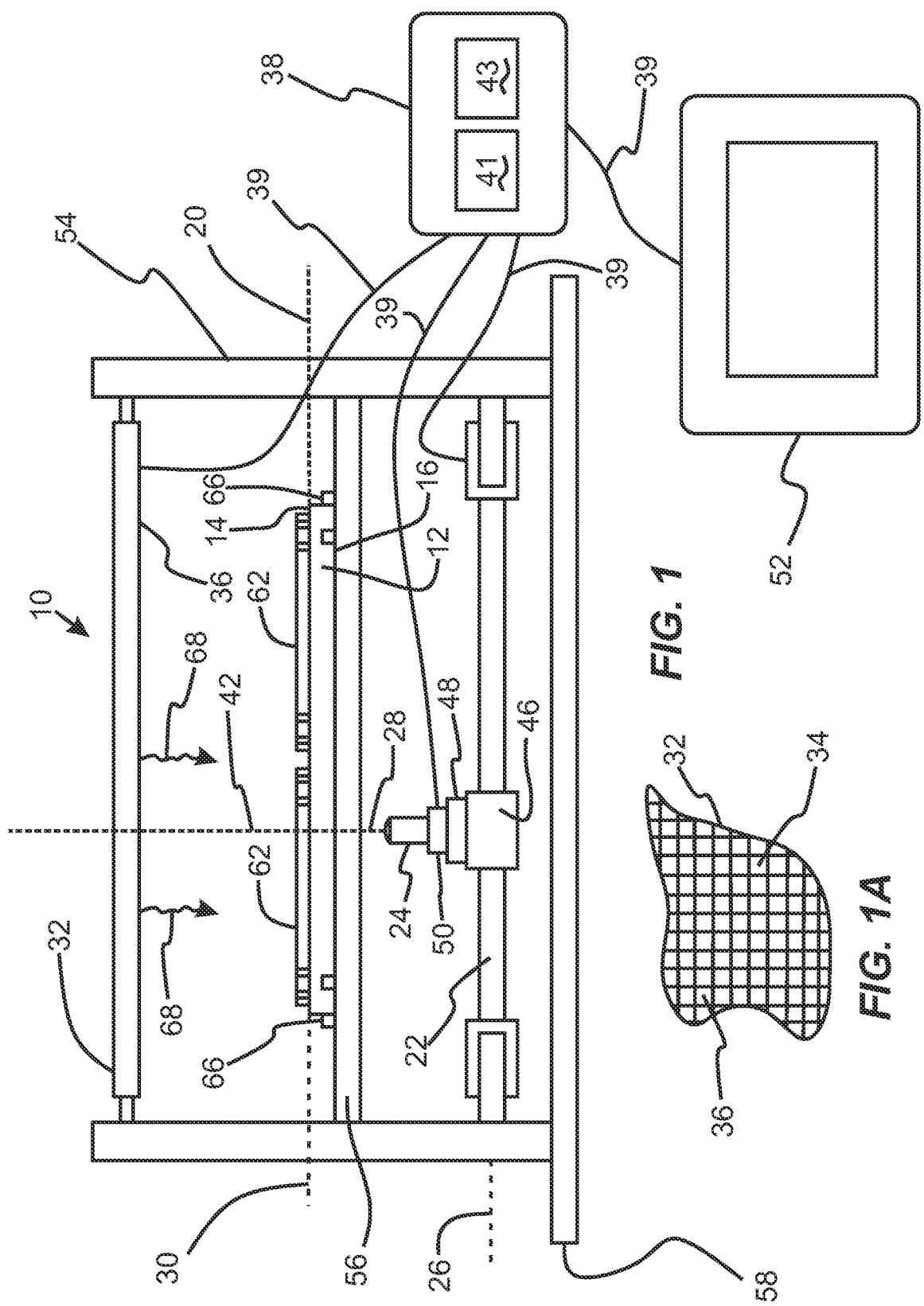

ILLUMINATION DISPLAY AS ILLUMINATION SOURCE FOR MICROSCOPY

RELATED APPLICATIONS

This application is a continuation of copending U.S. National Stage patent application Ser. No. 16/976,331, filed Aug. 27, 2020, by C. Shumate et al., titled "ILLUMINATION DISPLAY AS ILLUMINATION SOURCE FOR MICROSCOPY", now U.S. Pat. No. 11,740,447, which claims the benefit of priority to PCT Application No. PCT/US2019/048582, filed Aug. 28, 2019, by C. Shumate et al., titled "ILLUMINATION DISPLAY AS ILLUMINATION SOURCE FOR MICROSCOPY", which claims priority from U.S. Provisional Patent Application Ser. No. 62/724,579, filed Aug. 29, 2018, by C. Shumate et al., titled "PATTERENED DISPLAY AS ILLUMINATION SOURCE FOR CONTRAST ENHANCEMENT IN MICROSCOPY", each of which is incorporated by reference herein in its entirety.

BACKGROUND

Contrast enhancing techniques in microscopy sometimes require illumination with specified properties. Microscope sample illumination in transmitted light which has been manipulated to enhance contrast with phase contrast techniques is a prominent example of such special illumination properties. Specimens of low contrast, such as certain biological specimens, may be analyzed using contrast enhancing techniques that cause light intensity to vary in accord with spatial variation of optical path length of rays traversing adjacent parts of the specimen. Thus the normally invisible phase variation caused by interaction of light with a specimen causes visible intensity changes in an image. Phase contrast illumination devices typically include a light source, condenser lens, phase mask, and projection lens. The output light of such an apparatus should be aligned with the objective lens in many cases. Many other illumination strategies have been implemented in microscopy including Hoffman modulation contrast, Differential Interference Contrast, Polarized illumination and detection, structured illumination, light disks for microscopes, ring lights, including light emitting diodes (LEDs) for example, and phase modulation of excitation and emission measurements for fluorescent lifetime imaging.

In some instances it may also be desirable to translate a microscope objective relative to a specimen location or vice versa. What has been needed are imaging systems and methods that may be used to implement such enhanced contrast techniques as well as other microscopy techniques while allowing for transverse movement of the objective lens relative to a specimen location.

SUMMARY

Some embodiments of a microscope imaging system may include a specimen fixture having an illumination side, an imaging side and at least one specimen receptacle which is disposed in a specimen plane of the specimen fixture. The microscope imaging system may also include a translation stage which is disposed in fixed relation to the specimen fixture and which faces the imaging side of the specimen fixture. An objective may be operatively coupled to the translation stage, laterally translatable in an x-y plane that is substantially parallel to the specimen plane, and include an image input axis disposed towards the imaging side of the specimen fixture. The objective may also include an object plane which is substantially perpendicular to the image input axis and adjustable to be coplanar with the specimen plane. An illumination screen may be disposed in fixed relation to the specimen fixture. The illumination screen may further include an array of light emitting pixels and a flat illumination surface which is substantially parallel to the specimen plane. The flat illumination surface may be disposed facing the illumination side of the specimen fixture. A controller may be operatively coupled to the illumination screen and the translation stage and be configured to coordinate the transmission of an illumination signal to the illumination screen which produces emission of a light pattern from the flat illumination surface which has a light pattern axis that remains aligned with the image input axis of the objective as the objective is translated in the x-y plane from a first position to a second position.

Some embodiments of a method of microscopic imaging may include aligning an image input axis of an objective at a first position in a specimen plane of a specimen fixture, transmitting a first illumination signal to an illumination screen having a flat illumination surface that faces an illumination side of the specimen fixture, and emitting illumination light from a light pattern on the flat illumination surface of the illumination screen which has a light pattern axis that is aligned with the image input axis of an objective. The method may further include imaging the specimen plane at the first position with the objective. Thereafter, the objective may be translated in an x-y plane which is parallel with the flat illumination surface without moving the illumination screen relative to the specimen fixture. The image input axis of the objective is thereby translated from alignment with the first position in the specimen plane to alignment with a second position in the specimen plane. A second illumination signal may then be transmitted to the illumination screen and illumination light thereby emitted from the light pattern on the flat illumination surface of the illumination screen which has the light pattern axis thereof aligned with the image input axis of the objective at the second position. The method may also include imaging the specimen plane and any specimen or portion thereof at the second position with the objective.

Some embodiments of a microscope imaging system may include a specimen fixture comprising an illumination side, an imaging side and specimen receptacle which is disposed in a specimen plane of the specimen fixture. An illumination screen may be disposed in fixed relation to the specimen fixture facing the illumination side of the specimen fixture, and include a flat illumination surface that is configured to emit an annular light pattern having a light pattern axis. The microscope imaging system may also include a phase contrast objective which faces the imaging side of the specimen fixture, which includes an image input axis that is aligned with the light pattern axis, and which is configured to form an image of the annular light pattern of the illumination screen onto a phase ring of the phase contrast objective without the use of a condenser lens disposed between the illumination screen and the specimen plane and with the annular light pattern of the illumination screen not being effectively disposed at infinity with respect to the phase contrast objective.

Certain embodiments are described further in the following description, examples, claims and drawings. These features of embodiments will become more apparent from the following detailed description when taken in conjunction with the accompanying exemplary drawings.

BRIEF DESCRIPTION OF THE DRAWINGS

FIG. 1 is an elevation view of a microscope imaging system embodiment.

FIG. 1A is an enlarged view of a pixelated structure of an illumination screen embodiment of the microscope imaging system embodiment of FIG. 1.

The drawings are intended to illustrate certain exemplary embodiments and are not limiting. For clarity and ease of illustration, the drawings may not be made to scale, and in some instances, various aspects may be shown exaggerated or enlarged to facilitate an understanding of particular embodiments.

DETAILED DESCRIPTION

In the case of phase contrast illumination, a condenser lens may not be necessary for a phase contrast illumination device if the light source is an annulus of sufficient brightness and of the correct angular shape. Embodiments discussed herein may be used, in some cases, to replace a phase contrast illumination device or components thereof with an illumination display screen that may be configured to automatically align a light pattern axis of an output light pattern with an image input axis of an objective lens. A large format of such an illumination screen display may allow multiple specimen positions to be illuminated by multiple light patterns on the illumination screen without physical movement or replication of an overhead light. With moving imaging heads or multiple imaging heads, the illumination screen may be configured to adjust a graphical output of light patterns to align the position of emitted illumination corresponding to the graphical output with the position of the moveable imaging head or the active head(s) in an array of imaging heads such as objectives, including microscope objectives. The use of such enhanced techniques without the need of a condenser lens or the like may be desirable in some cases because this may be useful for eliminating moving parts (such as the condenser lens) disposed between the light source such as the illumination screen and the specimen being imaged. Such an arrangement may allow for more robust and reliable movement of the objective relative to the specimen as well as allowing for a simpler imaging system generally.

The ability to control and optimize dynamically the shape, color, position, brightness, time delay, trajectory, frequency and duration of the illumination pattern (or patterns) emitted from an illumination screen or the like may allow for enhanced image contrast during microscopy in many cases. In some cases, portions of such an illumination screen that are not emitting a significant amount of illumination, i.e., those portions of the display that are disposed adjacent to a graphical output or between a plurality of graphical outputs of the display, may be left dark or otherwise in a state that does not emit a significant amount of illumination for purposes of microscopy.

Figure 1B:
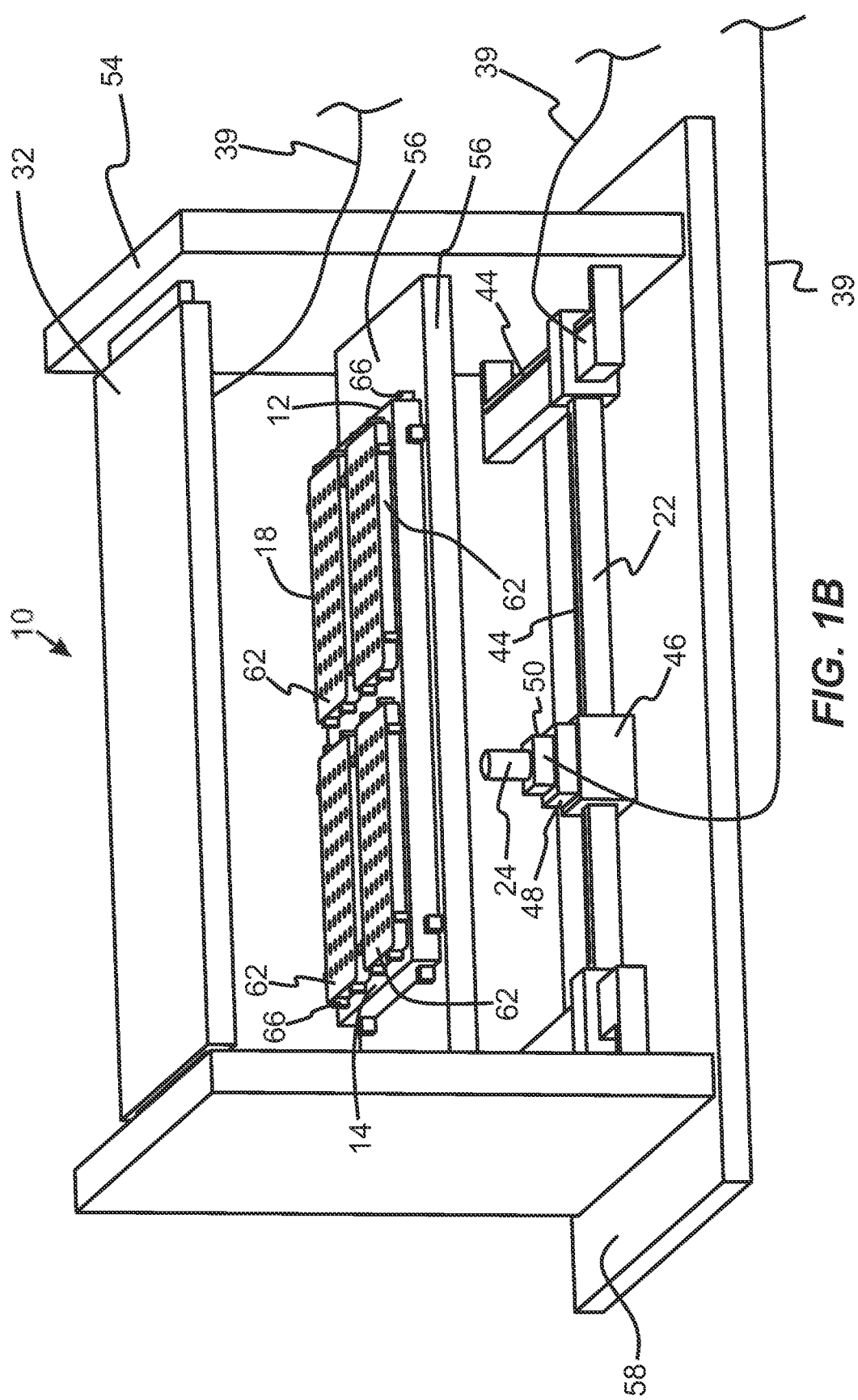
FIG. 1B is a perspective view of the microscope imaging system embodiment of FIG. 1 shown without the controller embodiment or display screen embodiment thereof.
Figure 2:
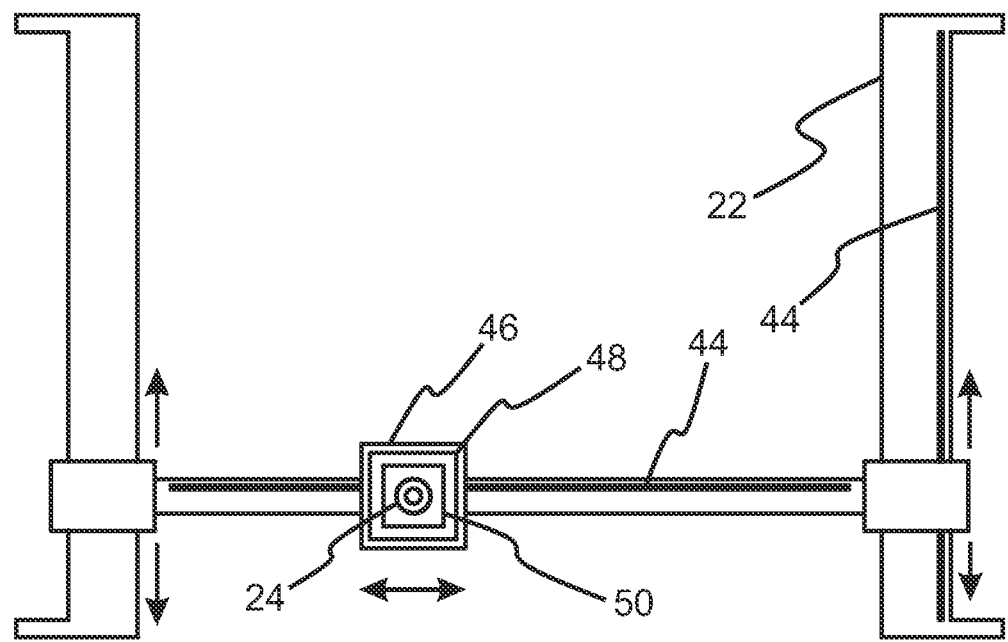
FIG. 2 is a top view of a translation stage embodiment of the microscope imaging system embodiment of FIG. 1.
Figure 3:
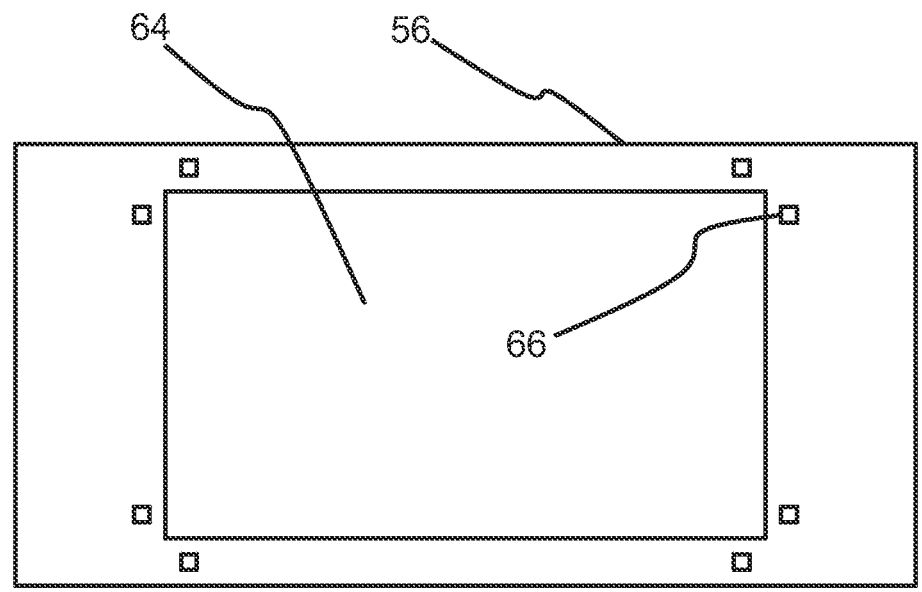
FIG. 3 is a top view of a fixture support embodiment of the microscope imaging system embodiment of FIG. 1.
Figure 4:
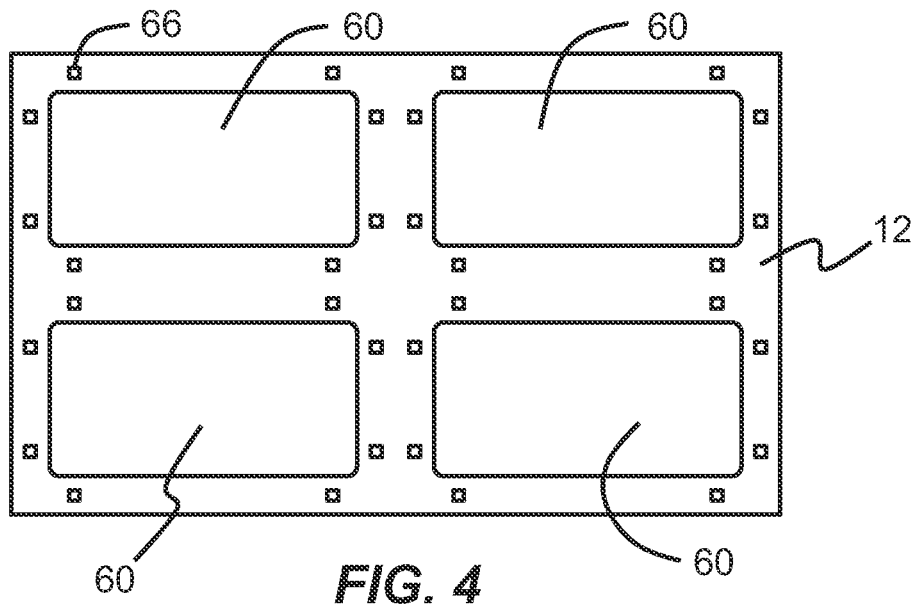
FIG. 4 is a top view of a specimen fixture embodiment of the microscope imaging system embodiment of FIG. 1.
Figure 5:
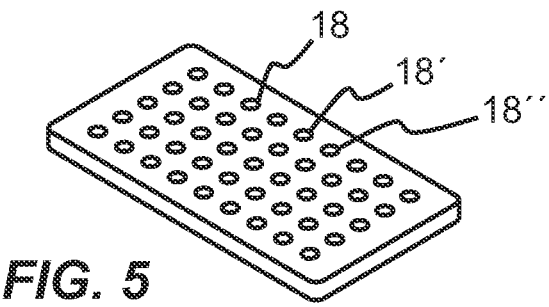
FIG. 5 is a perspective view of a specimen tray embodiment of the microscope imaging system embodiment of FIG. 1.

FIGS. 1-9 show an exemplary embodiment of a microscope imaging system 10 that may include a specimen fixture 12 having an illumination side 14, an imaging side 16 and at least one specimen receptacle 18 as shown in FIG. 5. The specimen receptacle 18 may be disposed in a specimen plane 20 of the specimen fixture 12. Referring to FIG. 1, the microscope imaging system 10 may also include a translation stage 22 which is disposed in fixed relation to the specimen fixture 12 and which faces the imaging side 16 of the specimen fixture 12. An objective 24 may be operatively coupled to the translation stage 22, laterally translatable in an x-y plane 26 that is substantially parallel to the specimen plane 20, and include an image input axis 28 disposed towards the imaging side 16 of the specimen fixture 12. The objective 24 may also include an object plane 30 which is substantially perpendicular to the image input axis 28 and adjustable to be coplanar with the specimen plane 20. In some cases, embodiments of the objective 24 may include a microscope objective lens with a magnification power of about 10× to about 120× and a working distance of about 0.1 mm to about 10 mm. The objective 24 may also include specialized contrast objectives such as a phase contrast microscope objective lens.

Although the microscope imaging system embodiment 10 is shown as an "inverted" type system with the objective 24 facing an upward direction, the same or similar arrangement of components of the microscope imaging system 10 could also be used in a non-inverted configuration. In addition, although the microscope imaging system 10 is configured to have the specimens 70, specimen receptacles 18 and specimen fixture 12 disposed in fixed relation to the frame 54 with the objective 24 configured to translate relative thereto, the inverse arrangement could also be used whereby the objective 24 is fixed relative to the frame 54. However, in many cases, it may be preferred to keep the specimens 70 stationary to prevent sloshing or otherwise physically agitating the specimens 70. The fixed specimen configuration shown also tends to be more compact.

An illumination screen 32 may be disposed in fixed relation to the specimen fixture 12. The illumination screen 32 may further include an array of light emitting pixels 34 and a flat illumination surface 36 which is substantially parallel to the specimen plane 20. The flat illumination surface 36 may be disposed facing the illumination side 14 of the specimen fixture 12. A controller 38 may be operatively coupled to the illumination screen 32 and the translation stage 22 with conduits 39 and be configured to coordinate the transmission of an illumination signal to the illumination screen 32 which may be configured to produce emission of a light pattern 40 from the flat illumination surface 36. In some cases the controller 38 may be configured to coordinate the transmission of a dynamic illumination signal to the illumination screen 32 which produces emission of a light pattern 40 which has a light pattern axis 42 that tracks across the flat illumination surface 36 and remains aligned with the image input axis 28 of the objective 24 as the objective 24 is translated in the x-y plane 26 from a first position to a second position in the x-y plane 26.

Figure 6:
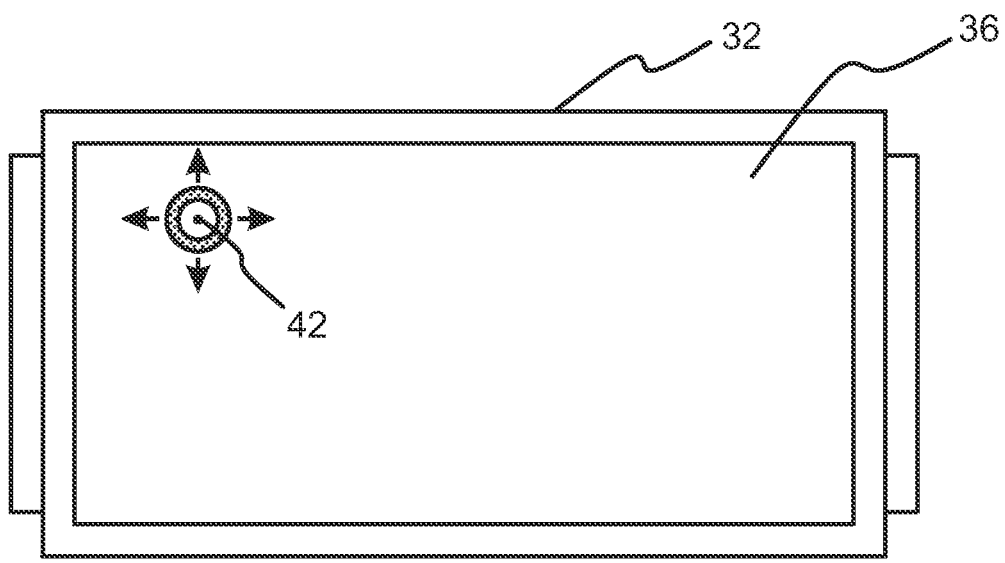
FIG. 6 is a bottom view of the illumination screen embodiment of the microscope imaging system embodiment of FIG. 1.

In some cases, the light pattern axis 42 may be configured as an axis of symmetry of the light pattern 40. For example, for a light pattern 40 configured as an annular light pattern as shown in FIG. 6, the light pattern axis 42 may be disposed in the center of the light emitting annular pattern. The illumination light 68 that is emitted from the light pattern 40 of the flat illumination surface 36 of the illumination screen 32 propagates at a variety of angles towards the illumination side 14 of the specimen fixture 12. The illumination light 68 illuminates the specimen 70 and the specimen plane 20 disposed adjacent the light pattern axis 42 and specimen 70. The illumination light, or scattered derivatives thereof, then propagates to the objective 24 and then into the image sensor 50 which may be configured to generate an image signal for display on the display screen 52.

The conduits 39 that interconnect the controller 38 with the illumination screen 32, translation stage 22, image sensor 50 and display screen 52 discussed below may include any suitable type of conduit configured to transmit energy, information or the like. As such, the conduits 39 may include conductive wires, including coaxial cables, fiber optic cables, wireless links or the like. Embodiments of the controller 38 may include one or more processors, including microprocessors 41, memory including digital memory 43 and any circuitry or other components such as video cards or the like which may be desirable in order to interconnect and use these or other elements of the controller 38 and microscope imaging system embodiments 10 generally.

In some cases, the specimen fixture 12 may include a plurality of specimen receptacles 18. In some instances, the specimen receptacles 18 may be disposed on specimen tray embodiments 62 which are, in turn, disposed on the specimen fixture 12. The controller 38 may be configured to coordinate the transmission of an illumination signal to the illumination screen 32 which produces emission of the light pattern 40 from the flat illumination surface 36 which has a light pattern axis 42 that remains aligned with the image input axis 28 of the objective 24 as the objective 24 is translated in the x-y plane 26. In some cases, such tracking of the light pattern axis 42 and image input axis 28 may occur as the objective 24 is being translated from a first position with the image input axis 28 aligned with a first specimen receptacle 18' to a second position with the image input axis 28 aligned with a second specimen receptacle 18" as shown in FIG. 5. For some embodiments, the emission of illuminating light 68 may be reduced or eliminated during translation of the objective 24 from the first position 18' to the second position 18" and only activated when the objective 24 is disposed at either the first position 18' or the second position 18". For some embodiments, the controller 38 may be configured to align the image input axis 28 of the objective 24 with the light pattern axis 42 of the light pattern 40 by mapping positions of the image input axis 28 to corresponding positions on the flat illumination surface 36 of the illumination screen 32. For some embodiments, the controller 38 may be configured to generate the illumination signal and coordinate the transmission of the illumination signal to the illumination screen.

In some instances, the microscope imaging system 10 may further include one or more position sensors 44 operatively coupled to the translation stage 22 and controller 38. The position sensors 44 may include optical encoder strips and corresponding readers as shown or any other suitable type of position sensor 44. The controller 38 may be configured to receive position information from the position sensor 44 regarding the position of the image input axis 28 of the objective 24 prior to coordinating transmission of the illumination signal to the illumination screen 32. In some cases, the translation stage 22 may be translated by a plurality of servo motors (not shown), stepper motors (not shown) or any other suitable type of motor and the controller 38 may be configured to determine the position of the objective 24 and image input axis 28 by determining the position of each of the motors and optionally accessing a lookup table.

For some embodiments, the translation stage 22 may further include a carrier 46 which is configured to translate in the x-y plane 26 of the translation stage 22 with the objective 24 being secured in fixed relation to the carrier 46 of the translation stage 22. In addition, a focus mechanism may be configured to adjust the position of the object plane 30 of the objective 24 along the image input axis 28 relative to the specimen plane 20. In some cases, such a focus mechanism may include a z-axis actuator 48 which is operatively coupled between the carrier 46 and the objective 24 and may be configured to adjust the position of the object plane 30 of the objective 24 along the image input axis 28 relative to the specimen plane 20. Such z-axis adjustment may also be useful in some instances for keeping illumination light 68 emitted from a light pattern 40 imaged onto a phase contrast ring 78 of a phase contrast objective 24 as discussed in more detail below. In particular, z-axis translation of the objective 24 relative to the specimen fixture 12 or specimen 70 disposed thereon may be useful in order to focus the objective onto the specimen 70 or portion of interest of the specimen 70. However, such z-axis translation of the objective 24 relative to the specimen fixture 12 may also result in relative z-axis translation between the objective 24 and the illumination screen 32. In some cases, such relative translation between the objective 24 and a light pattern 40 disposed on the flat illumination surface 36 of the illumination screen 32 may hinder imaging of the light pattern 40 onto the phase contrast ring 78 of a phase contrast embodiment of the objective 24. In order to counter such hindering of the imaging of the light pattern 40, the phase contrast ring 78 of the phase contrast embodiment of the objective 24 may be made wider in order to accommodate for movement or widening of the image of the light pattern 40 being imaged thereon. This approach, while useful, may also hinder the transmission of illumination light 68 through the objective 24 generally and reduce the brightness of the image. Another useful approach to accommodate what would otherwise be relative displacement between the objective 24 and the illumination screen 32 during focusing or any other z-axis translation of the objective 24, may include translating the illumination screen 32 in the z-axis in concert with the z-axis translation of the objective 24. For such an embodiment, one or more motors (not shown) could be operatively coupled between the frame 54 and the illumination screen 32 and configured to translate the illumination screen 32 by a z-axis displacement that matches z-axis displacement of the objective 24 by virtue of the z-axis actuator 48. In addition, for some embodiments 10, the illumination screen 32 and objective 24 may be configured to remain stationary relative to each other, and the specimen fixture 12 may be operatively coupled to the frame 54 with one or more motors (not shown) which may serve to translate the specimen fixture 12 in the z-axis along the image input axis 28 of the objective 24. Such a configuration would allow focusing of the objective 24 on the specimen 70 disposed on the specimen fixture 12 without changing the relative separation between the flat illumination surface 36 of the illumination screen 32 and the objective 24. In some cases, the z-axis actuator 48 may include a translation range of up to about 10 mm or more.

Some embodiments of the microscope imaging system 10 may also include an image sensor 50 operatively coupled to the objective 24 and with the controller 38 operatively coupled to the image sensor 50 by conduits 39. In some cases, the image sensor 50 may include a camera, such as a complementary metal-oxide semiconductor (CMOS) camera or a charge-coupled device (CCD) camera. 18. For some embodiments, an optional display screen 52 may be operatively coupled to the controller 38 and be configured to display an image captured by the image sensor 50. The display screen 52 may be coupled to the controller 38 by one or more conduits 39. In some cases, the image sensor 50 may be operatively coupled directly to the display screen 52 by one or more conduits 39 (not shown).

Some embodiments of the microscope imaging system 10 may include a rigid frame 54 which is rigidly coupled to a specimen fixture support 56, the illumination screen 32 and translation stage 22. The rigid frame 54 may also include a rigid base 58 which has a flat bottom surface and which is disposed at the bottom of the rigid frame 54. The rigid frame 54 may be made from any suitable high strength material such as steel, aluminum, composite materials such as carbon fiber or the like. The rigid frame 54 may serve as a rigid scaffold in order to prevent relative movement between the specimen fixture 12, the illumination screen 32, and the translation stage 22 as the objective 24 is translated in the x-y plane 26 on a carrier 46 of the translation stage 22. Although the rigid frame 54 is shown having a fairly open configuration, the rigid frame 54 could also be enclosed with adjoining removable flat thin panels covering the front, back and top of the outer perimeter of the rigid frame 54. Although the illumination screen 32 is nominally secured in fixed relation to the specimen fixture 12, in some cases it may be desirable for the illumination screen 32 to be releasably secured to the frame 54 in order to provide access to the specimen fixture in order to place or exchange specimens 70, specimen trays 62 or the like during use. As such, in some cases it may be useful for the illumination screen 32 to be hinged relative to the frame 54 such that one or more sides of the illumination screen 32 can be pivoted clear of the specimen fixture 12 and then easily be returned to its original position parallel to the specimen plane 20 by setting it back down.

Embodiments of the specimen fixture 12 may include one or more central apertures 60 configured to permit unobstructed imaging of one or more specimen trays 62 disposed thereon while still providing stable support for the specimen trays 62. Although the apertures 60 may be described as central apertures 60, such apertures may be disposed at any suitable location on embodiments of the specimen fixture 12 in order to facilitate imaging of specimens 70 disposed thereon. The specimen tray embodiments 62 may each include one or more specimen receptacles 18 which may be configured to hold specimen 70 in a position suitable for microscopic imaging thereof. For example, embodiments of the specimen fixture 12 may be configured to position a microscope slide and optional accompanying cover (not shown). In addition, some specimen tray embodiments 62 include a plurality of specimen receptacles 18 that may be arranged in rows and columns of an array of specimen receptacles 18. In some cases, the specimen tray embodiments 62 may include about 4 specimen receptacles 18 to about 1600 specimen receptacles 18. Common configurations of specimen trays 62 including microtiter trays or plates and the like may include 6, 12, 24, 48, 96, 384 or 1536 specimen receptacles 18 in the form of specimen wells.

The specimen fixture support 56 which is secured in fixed relation to the frame 54 and which provides mechanical support for the specimen fixture 12 may also include a central aperture 64 to allow unobstructed imaging of the specimen trays 62 disposed on the specimen fixture 12. Both the specimen fixture support 56 and specimen fixture 12 may include positioning pins 66 that may be secured to respective illumination surfaces of the specimen fixture support 56 and specimen fixture 12. The positioning pins may be configured to laterally secure the specimen trays 62 to the specimen fixture 12 and to laterally secure the specimen fixture 12 to the specimen fixture support 56. As such, the positioning pins 66 or any other suitable structure may be configured to define a perimeter that closely fits to an outer lateral surface of the specimen trays 62 or specimen fixture 12.

Figure 7:
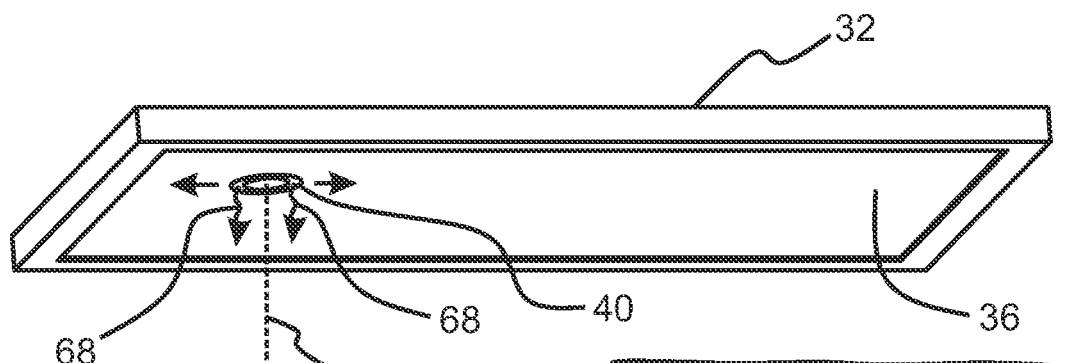
FIG. 7 is an underside view in perspective of a light pattern embodiment being emitted from the flat illumination surface of the illumination screen embodiment of FIG. 6.

For some embodiments, the illumination screen 32, as shown in FIG. 7, may include a pixelated display screen such as a liquid crystal display (LCD) screen, a plasma display screen or the like. In some instances, the flat illumination surface 36 may be configured to emit illumination light 68 from a pixelated structure including about 10 to about 500 pixels per inch. In some cases, the illumination screen 32 may have a brightness of about 100 candelas per square meter to about 800 candelas per square meter. In addition, the illumination screen 32 may be configured to generate a light pattern 40 with illumination light 68 having an adjustable wavelength of about 400 nm to about 700 nm. Any of the illumination screen embodiments 32 discussed herein may also use any suitable array of alternative light sources such as light emitting diodes (LEDs), vertical cavity surface emitting lasers (VCSELs) or the like.

Figure 7A:
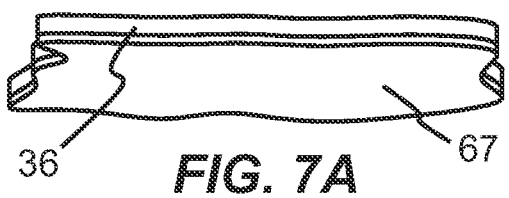
FIG. 7A is an underside view broken away of an illumination screen embodiment of FIG. 6 and an optical layer disposed over the flat illumination surface of the illumination screen.
Figure 8:
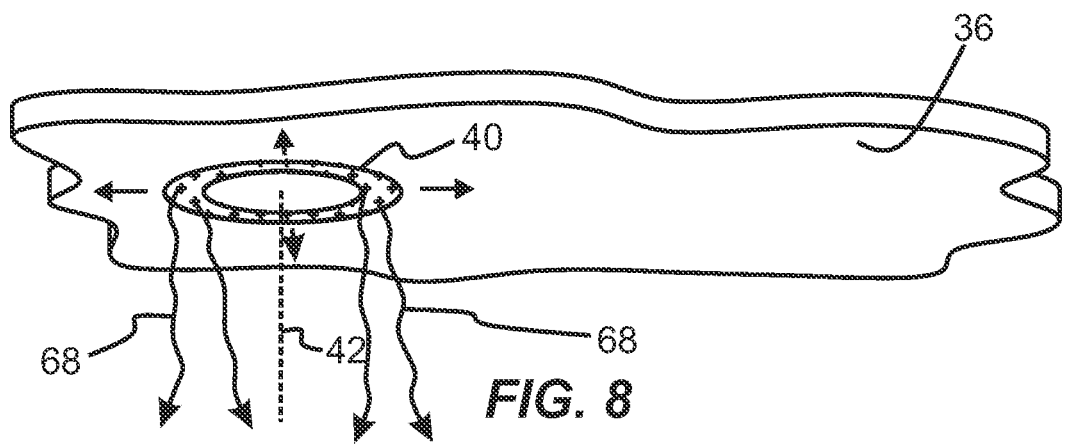
FIG. 8 is an enlarged view of the light pattern embodiment being emitted from the flat illumination surface of the illumination screen embodiment of FIG. 7.
Figure 9:
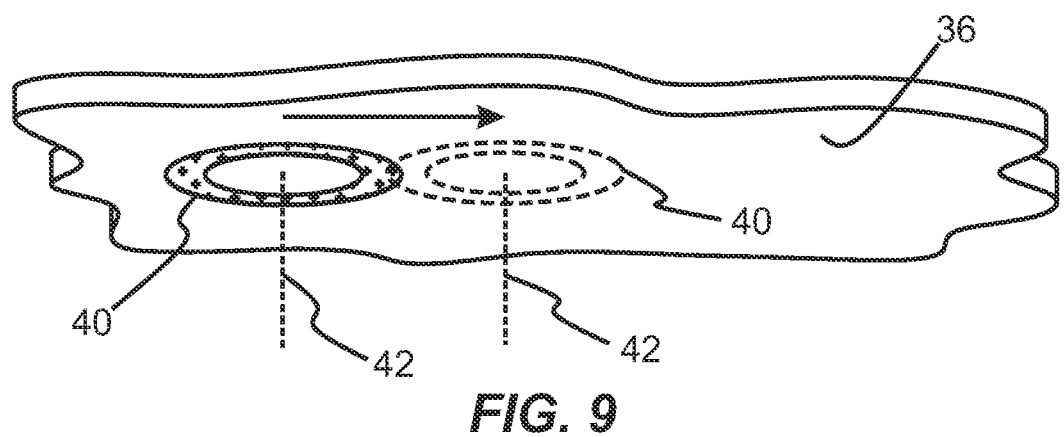
FIG. 9 shows a light pattern embodiment moving across the flat illumination surface of the illumination screen embodiment of FIG. 6.

For some illumination screen embodiments 32, such as an illumination screen embodiment 32 utilizing LCD display technology, the illumination light 68 emitted therefrom may be polarized or partially polarized. For some applications, the emission of polarized or partially polarized illumination light 68 may have certain benefits, but in other applications, such polarized illumination light 68 may be detrimental to the process. As such, in some cases, it may be desirable to include an optional element such as an optical layer 67 disposed over the flat illumination surface of the illumination screen 32, as shown FIG. 7A, that may be configured to reduce or eliminate the polarization of illumination light emitted from certain illumination screen embodiments 32. Embodiments of such optical layers 67 may include a waveplate or retarder type optical layer 67 that serves to reduce or eliminate the polarization of illumination light embodiments 68 emitted from the flat illumination surface 36 of the illumination screen 32. Such a waveplate or retarder layer may be used to modify the polarization state of the illumination light 68 without reducing the intensity or direction of the illumination light 68. Some such optical layer embodiments 67 may serve to rotate linear polarization or transform linear polarization into circular polarization and may include birefringent, crystalline or polymer materials that create a phase shift between polarization components. Some specific examples of such optical layers may include ¼-waveplates, ½ waveplates as well as zero order and achromatic waveplates or retarders. In some cases, such an optical layer may be disposed at any position between the sample 70 and the illumination screen 32. For the embodiment shown in FIG. 7A, the optical layer is disposed on the outer surface of the flat illumination surface 36 of the illumination screen 32.

Some embodiments of a method of microscopic imaging while using microscope imaging system embodiments such as those discussed herein may include aligning the image input axis 28 of the objective 24 at a first position in the specimen plane 20 of the specimen fixture 12 and transmitting a first illumination signal to the illumination screen 32. The illumination screen 32 may include the flat illumination surface 36 that faces the illumination side 14 of the specimen fixture 12. Illumination light 68 is then emitted from the light pattern 40 of the flat illumination surface 36 of the illumination screen 32 which corresponds to the illumination signal transmitted. The light pattern 40 generated by the first illumination signal may be positioned to have a light pattern axis 42 that is aligned with the image input axis 28 of an objective 24. The method may further include imaging the specimen plane 20 at the first position 18' (see FIG. 5) with the objective 24. Thereafter, the objective 24 may be translated in the x-y plane 26 which is parallel with the flat illumination surface 36. The objective 24 may be so translated without moving the illumination screen 32 relative to the specimen fixture 12 such that the image input axis 28 of the objective 24 is translated from alignment with the first position 18' in the specimen plane 20 to alignment with a second position 18" in the specimen plane 20. A second illumination signal may then be transmitted to the illumination screen 32 and corresponding illumination light 68 emitted from the light pattern 40 of the flat illumination surface 36 of the illumination screen 32 which has a light pattern axis 42 that is aligned with the image input axis 28 of the objective 24 at the second position 18". The method may also include imaging the specimen plane 20 at the second position with the objective 24.

In some instances, such a method may further include emitting illumination light 68 from the light pattern 40 and maintaining the alignment of the light pattern axis 42 with the image input axis 28 of the objective 24 as the objective 24 is being translated in the x-y plane 26 from the first position 18' to the second position 18" without moving the illumination screen 32 relative to the specimen fixture 12 such that translation of the light pattern axis 42 tracks the translation of the image input axis 28 of the objective 24 by virtue of a dynamic illumination signal that adjusts a position of the light pattern 40 to correspond to an x-y position of the objective 24. In some instances, such a method may further include imaging the specimen 70 or specimen receptacle 18 at the first position 18' in the specimen plane 20 and imaging the specimen 70 or specimen receptacle 18 at the second position 18" in the specimen plane 20.

Figure 10:
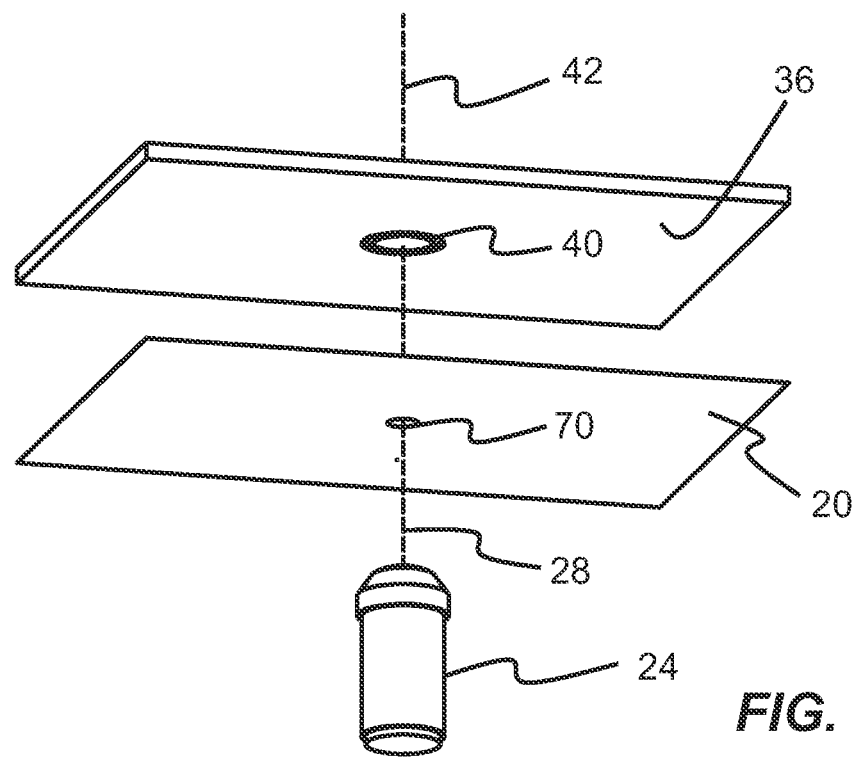
FIG. 10 shows an objective embodiment beneath and pointed towards a specimen plane where a specimen to be imaged may be located with emitted illumination from an annular light pattern facing the specimen and microscope.

In FIG. 10, the objective lens 24 of a microscope imaging system 10 is shown beneath and pointed towards a specimen plane or stage 20 where the object to be imaged or specimen 70 is located. Illumination screen 32 is shown with emitted illumination 68 from an annular illumination pattern 40 facing the specimen 70 and microscope objective lens 24. Specimen 70 is an object of interest to be imaged. A light pattern or shape 40 of an illumination object or zone is being emitted from a flat illumination surface 36 of the illumination screen 32 upon the specimen 70. In the side view cutaway view of FIG. 10, the inverted microscope objective 24 may be translated in the x-y plane 26 and in along a z-axis beneath the specimen plane 20 which is trans-illuminated from above by the illumination light pattern 40. Embodiments discussed herein may include the use of a flat illumination surface 36 of a standard computer monitor or TV display such as the illumination screen 32 as a method of displaying illumination patterns 40 and emitting corresponding illumination light patterns 40 for increased contrast used for microscopy and the like.

Figure 11:
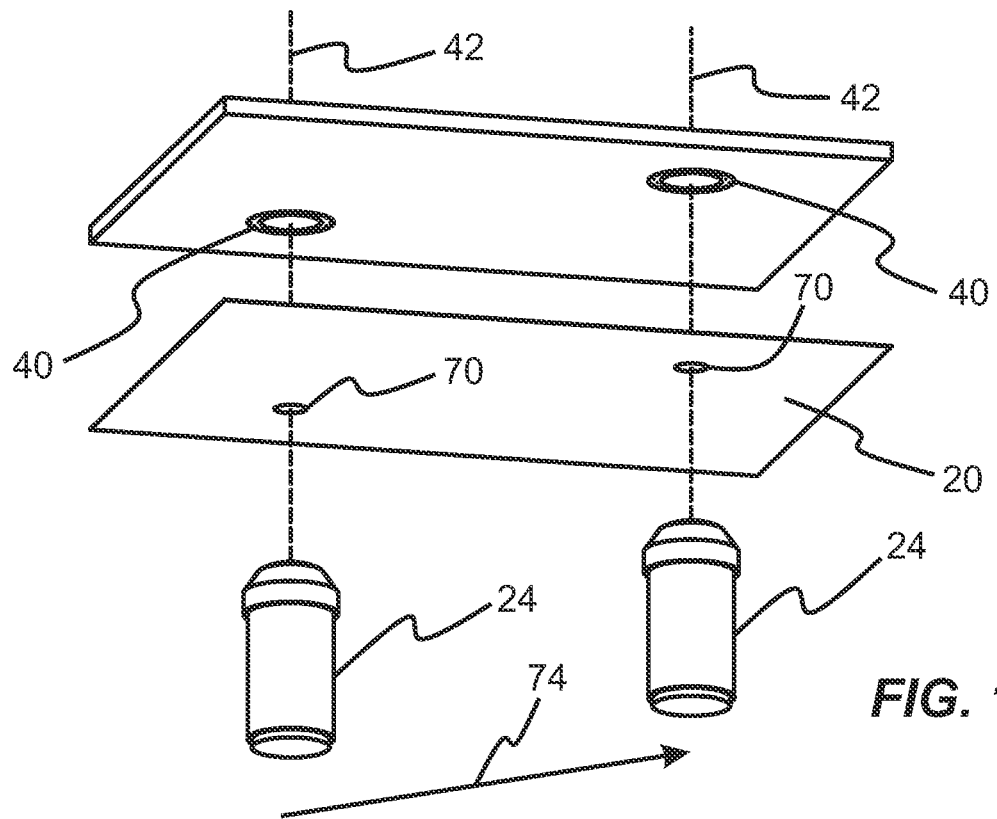
FIG. 11. shows the objective embodiment of FIG. 10 moving relative to the specimen plane, as indicated by an arrow, and the light pattern embodiment is also shown moving across the flat illumination screen of the illumination display embodiment in corresponding displacement to remain in alignment with the objective embodiment.
Figure 12:
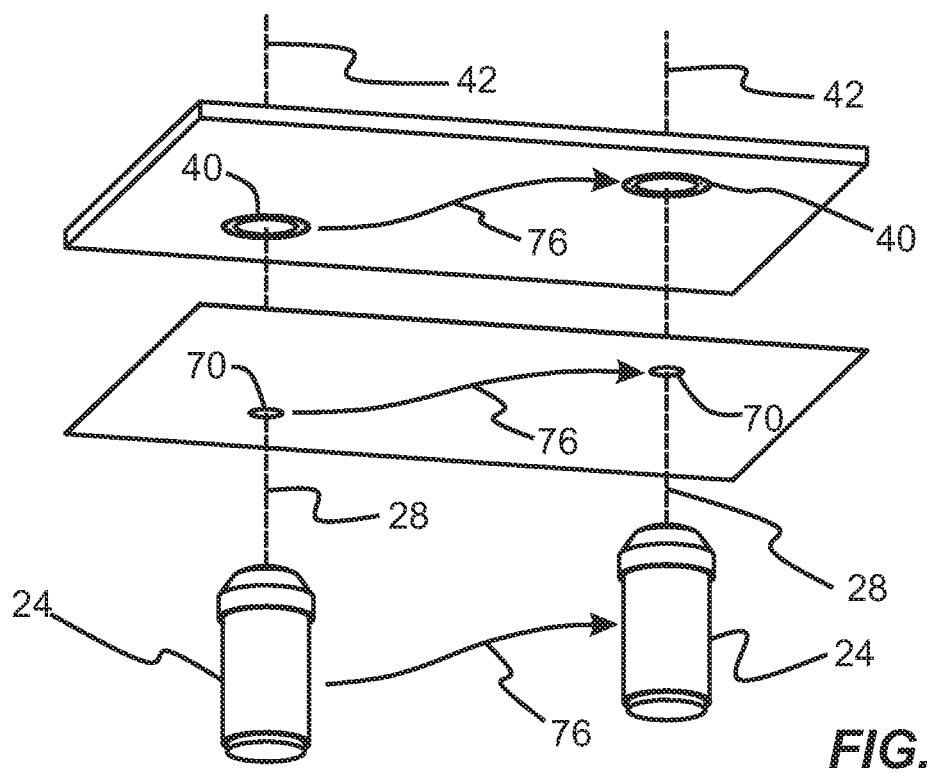
FIG. 12 shows that a specimen may be tracked as it moves within the specimen plane by maintaining a position of the specimen in a field of view of the objective embodiment automatically, and contemporaneously maintaining alignment of a light pattern axis with the corresponding objective embodiment.
Figure 13:
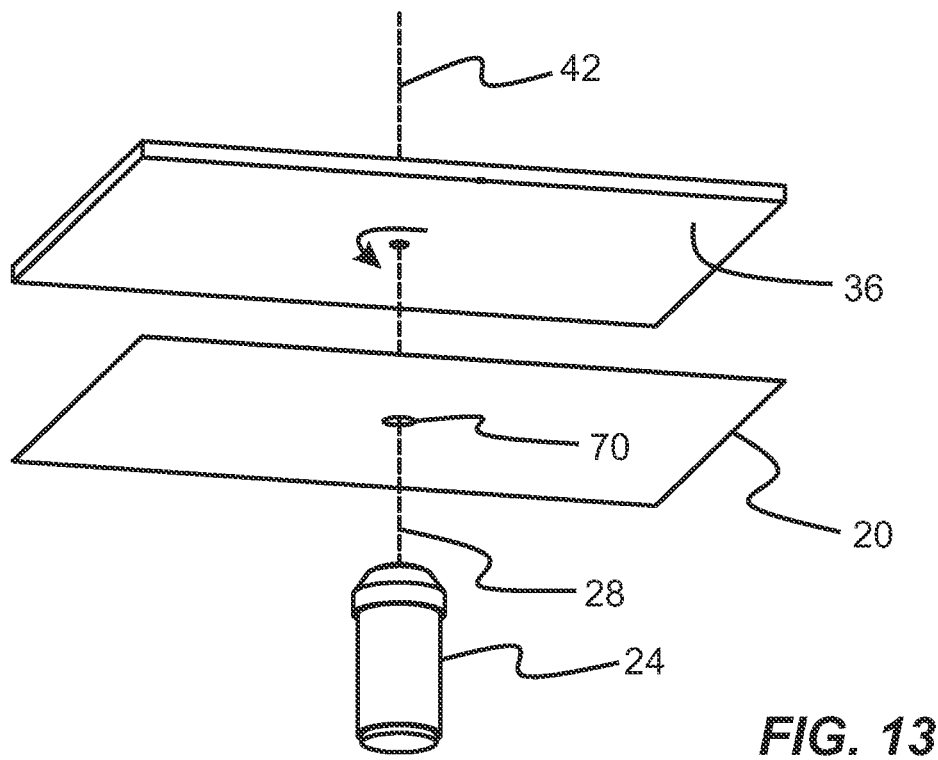
FIG. 13 shows a light pattern changing position over time while the objective embodiment receives image data with an image sensor (not shown) operatively coupled thereto.
Figure 14:
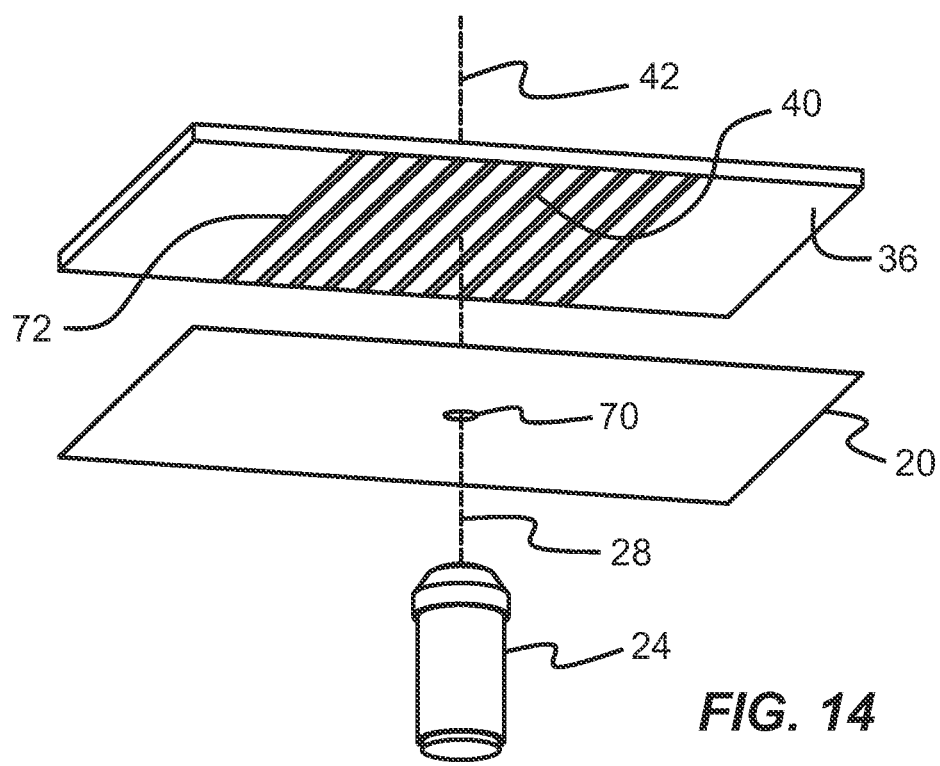
FIG. 14 shows a light pattern embodiment with a regularly repeating intensity variation.
Figure 15:
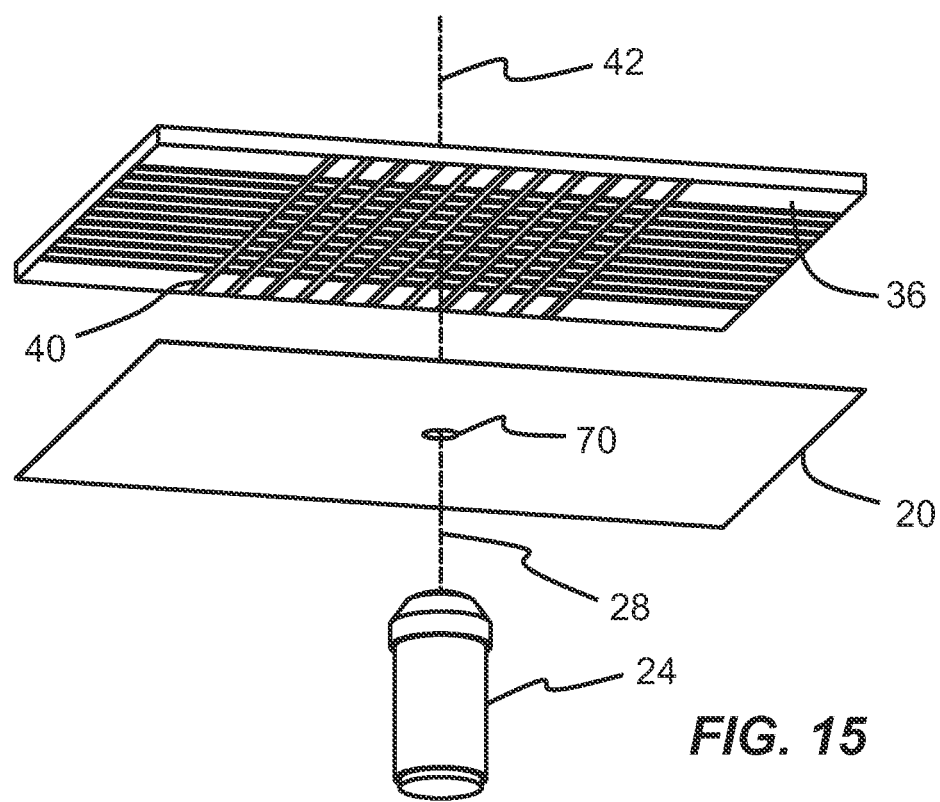
FIG. 15 shows a light pattern embodiment including a regularly repeating intensity variation in multiple dimensions.

Referring to FIG. 11, the objective 24 is shown moving relative to the specimen plane by the arrow 74 in FIG. 11. The illumination light pattern 40 is also shown moving across the flat illumination surface 36 of the illumination screen 32 in corresponding displacement to remain in alignment with the objective 24. FIG. 12 shows a specimen 70 being tracked by keeping it in the center of the field of view of the objective 24 automatically, and the illumination light pattern 40 may be maintained in alignment with the corresponding objective 24 as indicated by arrows 76. FIG. 13 illustrates an illumination light pattern 40 that may change position over time while the objective 24 images the specimen plane 20. In some instances, this technique may yield information on a 3-dimensional shape of the specimen 70. In some cases, the illumination light pattern 40 may include a regularly repeating intensity variation 72 of a light pattern 40 in one dimension both stationary and sweeping across the specimen plane 20 as shown in FIG. 14. In some cases, the illumination light pattern 40 may include a regularly repeating intensity variation in multiple dimensions both stationary and sweeping across the specimen plane 20 as shown in FIG. 15.

Some of the microscope imaging system embodiments 10, 10' (discussed below) herein may be directed generally to transmitted and oblique-illumination sources for microscope imaging or any other suitable form of imaging. In some cases, for a particular specimen 70, whether using a contrast enhancement technique or not, the quality of images generated from the objective 24 and image sensor 50 may vary depending upon changes in the direction from which illumination 68 arrives, and from changes in the pattern of the illumination light 68. By using a display screen 32 it may be possible to emit illuminating light 68 from a range of directions and in a variety of patterns. This makes possible manual or automated searches for optimal images by altering the direction and pattern of the illuminating light 68 and analyzing the images using software running on a computer such as processor 41.

Some microscope imaging system embodiments 10, 10' discussed herein may be directed to methods and devices for the use of a TV or monitor and its graphical display as a flexible illumination screen 32 with positional, multicolored, patterned, and dynamic display as bright field or transmitted illumination for enhanced contrast. The large format of display screen embodiment 32 including projector embodiments may allow the positions of multiple specimens 70 to be illuminated by emitting illuminating light 68 from certain portions of a flat illumination screen 36 of a display screen 32 without physical movement or replication of an overhead light fixture. The use of a planar illumination screen 32 for an illumination source allows a variety of shapes and patterns on such a screen to be optimized for the transmitted light pattern 40. The addition of an optional lens array or shade array (not shown) to manipulate the displayed light patterns 40 and illumination source into desired optical properties is contemplated herein as well.

Some microscope imaging system and method embodiments 10, 10' discussed herein may also be directed to methods and devices for the use of a projector and its associated projected graphics and light patterns 40 as a flexible illumination source with positional, multicolored, patterned, and dynamic display as bright field or transmitted illumination for enhanced contrast. Embodiments discussed herein are also directed to methods and devices for the automatic optimization of image quality based on feedback from a live image, such as may be generated by the image sensor 50.

By using a sufficiently large display screen 32 positioned so its output light 68 reaches a specimen 70 and then enters the objective lens 24 of a microscope, it is possible to cause an image to appear on the flat illumination surface 36 of the illumination screen 32 such that if the displayed light pattern 40 is of appropriate shape, color, and intensity, that image can serve as a light source for the microscope. In the case of phase contrast microscopy, as discussed above, it is possible to cause to appear on the display screen 32 an annulus of particular angular shape with reference to the center of the object field or image input axis 28 of a phase contrast objective lens, such that a phase contrast image is generated.

A light pattern 40 having an annular configuration displayed may be manually or automatically aligned with a corresponding image input axis 28 of the objective lens 24. In the case of automatic alignment, software running on a computer that receives images from the image sensor 50 in the microscope imaging system 10, 10' may execute an algorithm that calculates the optimum position and shape of the light pattern annulus 40 displayed by analyzing the images and altering the annulus configuration.

Some microscope imaging system embodiments 10, 10' discussed here may greatly simplify a hardware configuration as a single illumination screen 32 may be used as the light source hardware. No lenses or masks need to be used in many cases. Embodiments may also include the use of a sufficiently large illumination screen 32 such that it may be possible to position the output light 68 as needed for imaging a large area. This may make it possible to use a simpler design of an imaging system 10, 10' wherein the specimen(s) 70 remain stationary and the imaging optics such as the objective 24 move to scan an area. Using software control, only the patterns of illuminating light 68 emitted from the illumination screen 32 need to be moved or otherwise translated. The illumination screen 32 itself may be stationary, so there are no physical parts that need be moved to maintain illumination alignment with the imaging optics 24. The display may include a low profile, i.e., small height, making this highly advantageous in live cell imaging in incubators. Because the illumination screen 32 may be homogenous in light produced, variability across labware may be less in some cases. In some instances, for the microscope imaging system embodiments 10, 10' discussed herein, a vertical separation distance between the flat illumination surface 36 of the illumination screen 32 and the specimen plane 20 of the specimen fixture 12 may be about 5 cm to about 35 cm.

Some microscope imaging system embodiments 10, 10' discussed herein may include automation of alignment of the light pattern axis 42 of the output light pattern(s) with the image input axis 28 of the objective lens(es) 24. The output light 68 may also be optimized in some cases to provide a means of discovering new light patterns 40 which produce contrast. Arbitrary and variable shapes and colors of light may be used in a manual or automated search for the illumination condition that provides valuable images. Light patterns 40 may include bullseyes, checkerboards, half-moons, pinpoints, boxes, crosshairs, circles, squares, polygons, freehand lasso, pie chart rays and the like. Some embodiments 10, 10' discussed herein may also include the display of a phase annulus 40 and its size, position and thickness may be adjusted and optimized, including dynamically.

Some microscope imaging system embodiments 10, 10' discussed herein may also include single or multiple images acquired with structured light patterns 40 that may be used in combination with mathematical image analysis techniques to extract information about specimens 70. This may include the ability to orbit, raster, or spiral a small symmetrical spot of light around the field of view (FOV) while sequential images may be taken for enhanced 3-D imaging, DOF imaging, ptychography imaging and the like. Embodiments 10, 10' discussed herein may also include using the color of the display to optimize an imaging experiment. Using green to maximize detection by image sensor 50 and red to reduce the energy of the illumination, for example.

In some cases, embodiments 10, 10' discussed herein may also include the ability to reduce the energy of the illumination light 68 by pulsing the illumination light 68 at the frame rate or some offset. Sample lensing or general matrix effects may also be compensated for in some cases in order to flatten the image brightness by displaying or projecting a compensatory image light pattern 40. In some instances, illumination conditions may be stored in memory 43 and retrieved by the processor 41 to reduce the effort needed to acquire new images. Embodiments 10, 10' discussed herein may also include the ability to function over a range of distances from the objective lens 24 because the light patterns 40 may be scaled to control their angular size. This makes some embodiments useful for both robotic applications that require large operating clearance and incubator applications that require a compact system 10, 10'. The illumination screen 32 may also be used in some instances to provide an overhead shroud for fluorescence microscopy; shielding room light, protecting people's eyes from UV, etc. Embodiments discussed herein may also include shade arrays with and without lenses-honeycomb dimensional grid for limiting projection angles used in conjunction with a lens. Embodiments discussed herein may also include a variety of lenses, including ball lenses, concave lenses, convex lenses, Fresnel lenses, polarized lenses, reducing lenses, expanding lenses, directional lenses, and the like.

In some cases, an illumination light pattern 40 from an illumination screen may be used to effect biological and chemical mechanisms—photocaged compounds, photolysis, optogenetics, and optical chemical synthesis. Embodiments discussed herein may also include using the illumination light pattern 40 as an attractant or deterrent to a biological response.

Some embodiments of the illumination screen 32 may include an LCD, CRT, TFT, retinal display, DLP, LED, OLED type illumination screen 32 or the like. The illumination screen 32 may be of sufficient dimensions such that it emits light of one or more colors positioned so that the emitted light enters the objective lens 24. For such embodiments, the displayed illumination light 68 may be adjusted, including adjustment of the color of the illumination light 68, adjustment of the position of the light pattern 40 on the flat illumination screen 36, and adjustment of the time dependence of the illumination light 68. For some embodiments 10, 10' a light pattern image 40 may be used in feedback to optimize the illumination including automatically. One exemplary light pattern 40 may include a single circle of light centered above the objective 24 for "aperture illumination" with the center of the circle of light pattern 40 or light pattern axis 42 being aligned with the image input axis 28 of the objective 24. As discussed in more detail below, a plurality of microscope objectives 24 may be illuminated sequentially or simultaneously. In addition, many positions of a single microscope objective 24 may be illuminated sequentially or simultaneously. In some cases, wherein a plurality of microscope objectives 24 which are too close together may have individual illumination sources that include respective overlapping illumination light patterns 40 projected sequentially. Embodiments of the electronic image sensor 50 may be used for forming a system of sufficient sensitivity that permits transmission of the images to a computer including the controller 38 or components of a computer such as the microprocessor 41. Software running on the computer or microprocessor 41 of the controller 38 may be configured to control the illumination screen 32 and access the images from the same image sensor 50. Embodiments of the microscope imaging system 10, 10' may include an objective lens 24 of a type designed to generate any of bright field images, dark field images, phase contrast images, or other enhanced images.

In a phase contrast system generally, the image of an annulus of light is projected at optical infinity by passing the light 68 through a condenser lens (not shown). This light illuminates the specimen 70. The fraction of this light 68 that passes through the specimen 70 without deviation enters a phase contrast type objective 24. Such objectives are designed to focus this light 68 onto an internal phase ring. This may be useful in order to achieve the phase contrast effect. If an annular light source is used to illuminate a specimen 70 without a special phase contrast objective lens then its image may not be projected at infinity and the undeviated light will not be focused on the phase ring inside the objective. In some cases, this may degrade the phase contrast effect.

The phase contrast effect may generally be improved or restored by designing a special phase contrast objective lens 24 which is configured to focus an image of the annulus of light onto the internal phase ring of a phase contrast objective for the case of an annular light source that is positioned at some known distance from the objective, without an interposed lens as in the standard phase contrast system.

Figure 16:
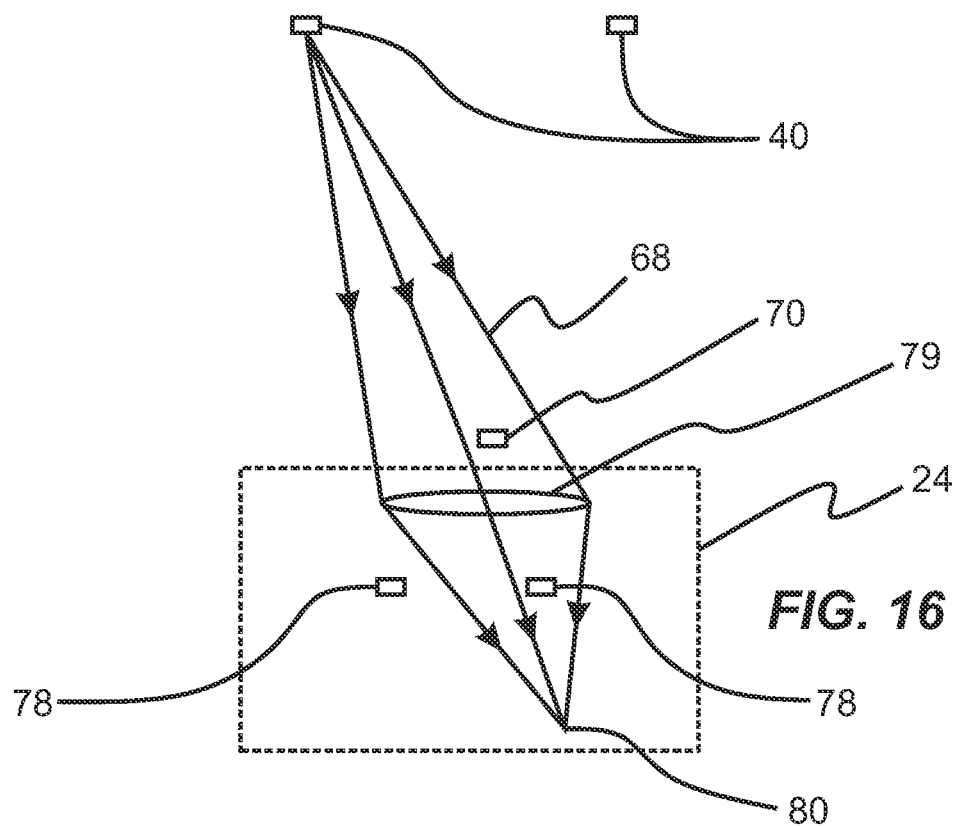
FIG. 16 is a schematic representation of illumination light emitted from an annular light pattern embodiment passing through a specimen embodiment and into a phase contrast objective embodiment.

FIG. 16 is a schematic representation of an objective 24 that is configured as a typical phase contrast type objective including a phase ring 78 disposed within the objective optical train. The phase ring 78 is represented by two schematic cross section segments. The objective is disposed below a specimen 70 which is being illuminated by an annular light pattern 40 represented by two schematic cross section segments of the annular light pattern 40. Generally speaking, such a phase contrast microscopy configuration would include a condenser lens (not shown) aligned with the optical axis of the system and disposed between the annular light pattern 40 and the specimen 70. Such a condenser lens would typically be configured to correct the angle of the illumination light 68 emitted from the light pattern 40 so as to effectively present the light pattern 40 at a distance of infinity from the objective 24 and specimen 70. For such an arrangement, the light pattern 40 would be imaged by the objective lens 79 onto the phase ring 78 disposed within the objective so as to yield a high degree of phase contrast for the image generated by the phase contrast objective 24. However, such a condenser lens may be inconvenient to include and position in such a system, particularly such a system wherein it may be desirable to translate the objective 24 relative to the specimen 70. Without such a condenser lens, the light pattern 40 is not properly imaged onto the phase ring 78 as indicated by the displacement of the point of intersection 80 of the rays of illumination light 68 being positioned below the phase ring 78 within the objective 24. Such an arrangement may not be effective to produce a useful amount of phase contrast during use.

Figure 17:
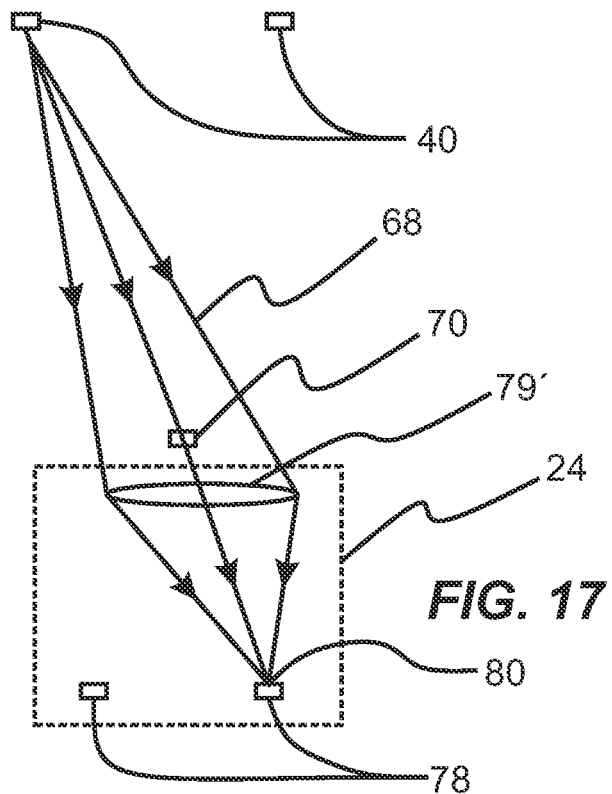
FIG. 17 is a schematic representation of illumination light emitted from an annular light pattern embodiment passing through a specimen embodiment and into a phase contrast objective embodiment.
Figure 18:
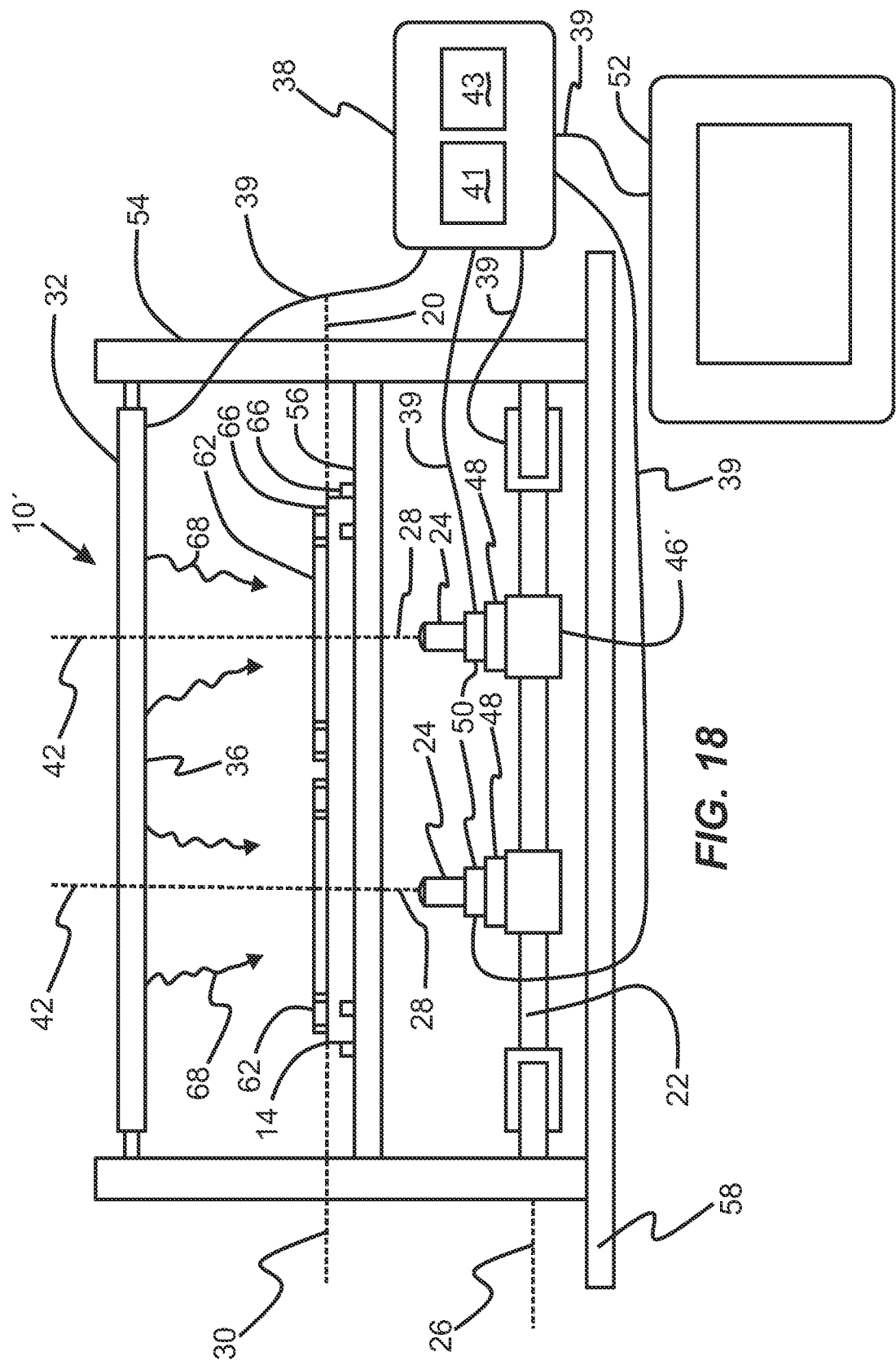
FIG. 18 is an elevation view of a microscope imaging system embodiment.
Figure 19:
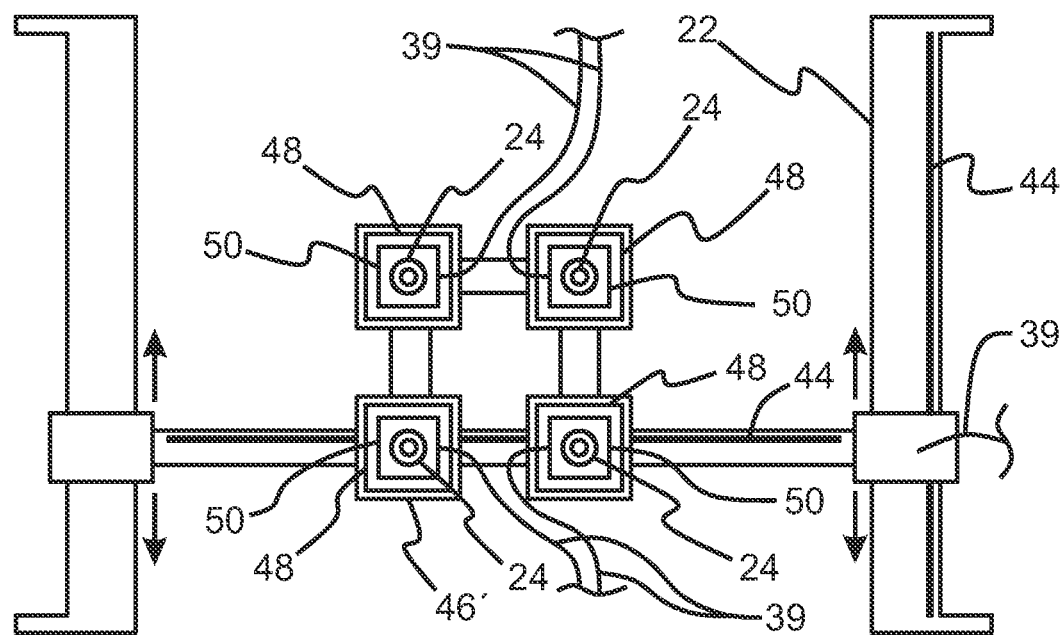
FIG. 19 is a top view of a translation stage embodiment.
Figure 20:
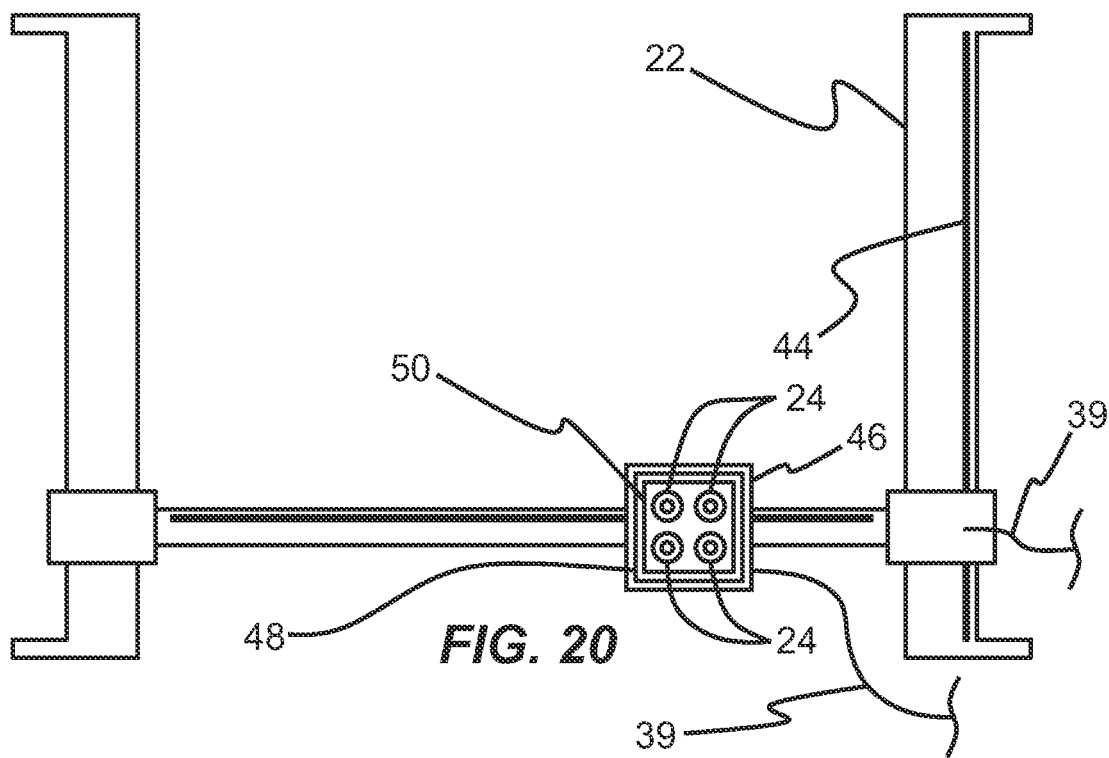
FIG. 20 is a top view of another translation stage embodiment.
Figure 21:
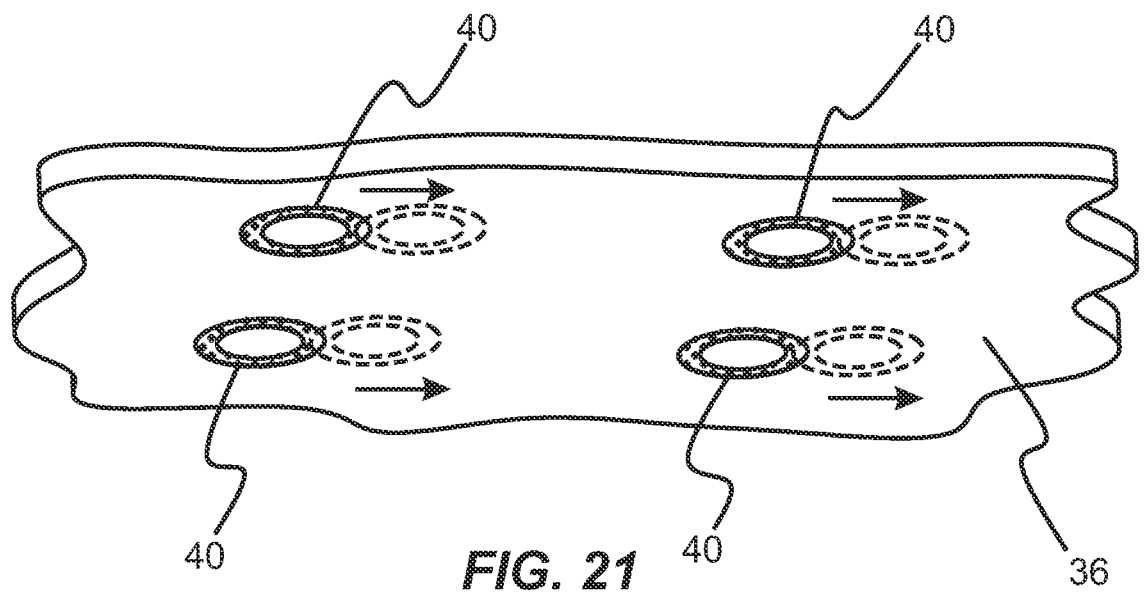
FIG. 21 is an underside view in perspective of a plurality of light pattern embodiments being emitted from the flat illumination surface of the illumination screen embodiment of FIG. 18 moving across the flat illumination surface.
Figure 22:
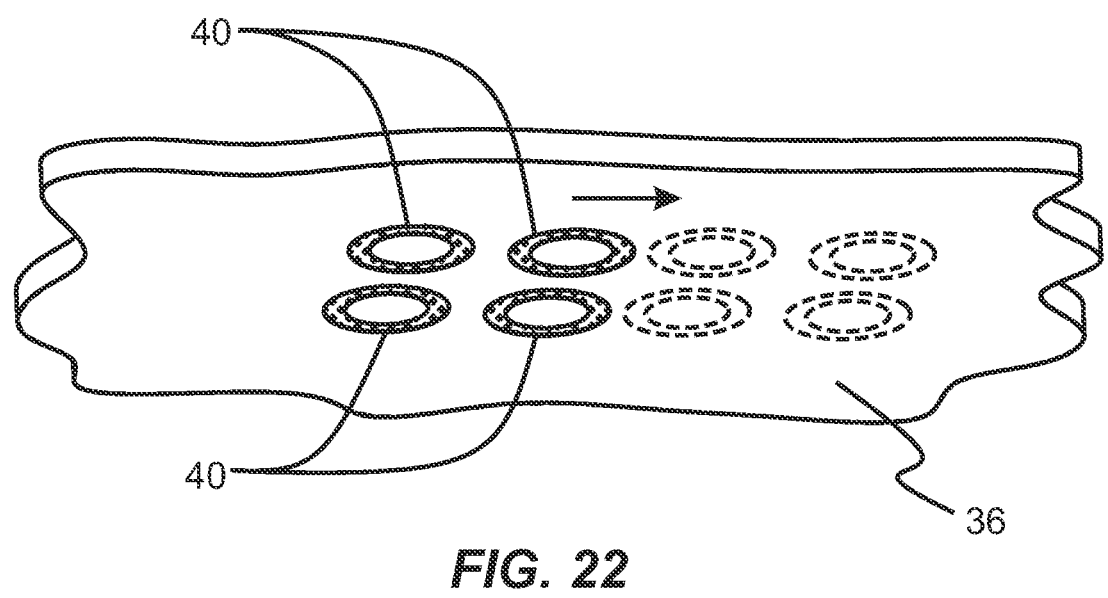
FIG. 22 is an underside view in perspective of a plurality of light pattern embodiments being emitted from the flat illumination surface of the illumination screen embodiment of FIG. 18 moving across the flat illumination surface.

In order to correct this effect, as discussed above, a special phase contrast objective 24 may be used that includes an objective lens 79' (and any other associated optics required to achieve the desired result) that is configured to image the light pattern 40 onto the phase ring 78 without the use of a condenser lens and with a light pattern 40 that is not effectively positioned at a distance of infinity from the objective 24 and specimen 70. FIG. 17 shows a schematic representation of an objective 24 disposed below a specimen 70 which is being illuminated by an annular light pattern 40 similar to the arrangement of FIG. 16. However, the objective lens 79' of the system of FIG. 17 has been modified so as to image the light pattern 40 onto the phase ring 78 even without the use of a condenser lens such as is typically used in a phase contrast system light source. As can be seen in FIG. 17, the point of intersection 80 of the rays of illuminating light 68 are coplanar with the phase ring 78 of the objective 24 and thus a proper amount of phase contrast will be generated by the system even without the use of a condenser lens in the system. Such a specially configured objective 24 and corresponding objective lens 79' (including any other associated optics required to achieve the desired result) may be used for any of the microscope imaging systems or methods discussed herein.

As such, some embodiments of a microscope imaging system 10 may include the specimen fixture 12 having the illumination side 14, the imaging side 16 and specimen receptacle 18 which is disposed in the specimen plane 20 of the specimen fixture 12. The illumination screen 32 may be disposed in fixed relation to the specimen fixture 12 facing the illumination side 14 of the specimen fixture 12, and include a flat illumination surface 36 that is configured to emit an annular light pattern 40 having a light pattern axis 42. The microscope imaging system 10 may also include a phase contrast objective 24 which faces the imaging side 16 of the specimen fixture 12, which includes the image input axis 28 that is aligned with the light pattern axis 42, and which is configured to form an image of an annular light pattern 42 of the illumination screen onto a phase ring 78 of the phase contrast objective 24 without the use of a condenser lens (not shown) disposed between the illumination screen 32 and the specimen plane 20 and with the annular light pattern 40 of the illumination screen 32 not being effectively disposed at infinity with respect to the phase contrast objective 24.

In some instances, the microscope imaging system 10 may further include the translation stage 22 which is disposed in fixed relation to the specimen fixture 12 and which faces the imaging side 16 of the specimen fixture 12. In addition, the phase contrast objective 24 may be operatively coupled to the translation stage 22 and be laterally translatable in the x-y plane 26, the x-y plane 26 being substantially parallel to the specimen plane 20 in some cases. Such a microscope imaging system embodiment 10 may further include the controller 38 which is operatively coupled to the illumination screen 32 and the translation stage 22 and be configured to coordinate the transmission of an illumination signal to the illumination screen 32 which produces emission of the annular light pattern 40 from the flat illumination surface 36. The annular light pattern 40 may include a light pattern axis 42 that remains aligned with the specimen receptacle 18 and the image input axis 28 of the phase contrast objective 24 as the phase contrast objective 24 is translated in the x-y plane 26 from a first position to a second position. For some embodiments, the controller 38 may be configured to align the image input axis 28 of the phase contrast objective 24 with the light pattern axis 42 by mapping positions of the image input axis 28 to corresponding positions on the flat illumination surface 36 of the illumination screen 32. In some cases, the translation stage 22 further includes a carrier 46 which may be configured to translate in the x-y plane 26 and the phase contrast objective 24 may be secured in fixed relation to the carrier 46 of the translation stage 22. In some instances, a focus mechanism may be configured to adjust the position of an object plane of the phase contrast objective 24 along the image input axis 28 relative to the specimen plane 20. For such embodiments, the focus mechanism may include the z-axis actuator 48 which may be operatively coupled between the carrier 46 and the phase contrast objective 24 and may be configured to adjust the position of the object plane of the phase contrast objective 24 along the image input axis 28 relative to the specimen plane 20. In some cases, such a system may include a plurality of phase contrast objectives 24.

To that end, any of the microscope imaging system and method embodiments discussed herein may include a plurality of objectives 24 in order to provide alternative contrast enhancement capabilities or for any other suitable purpose. Referring to FIGS. 18-22, some microscope imaging system embodiments 10' may include a plurality of objectives 24 which are operatively coupled to the translation stage 22 on the imaging side 16 of the specimen fixture 12, which are laterally translatable in the x-y plane 26 that is substantially parallel to the specimen plane 20, which each include an image input axis 28 disposed towards the imaging side 16 of the specimen fixture 12 and which each include an imaging plane or object plane 30 which is substantially perpendicular to the image input axis 28 and that may be adjusted along a z-axis of the objective 24 to be coplanar with the specimen plane 20. An image sensor 50 operatively coupled to each of the respective objectives 24 with the plurality of objectives 24. In some cases, the plurality of objectives 24 may be secured in fixed relation relative to each other in the x-y plane 26. In some instances, the plurality of objectives 24 may be each translatable in the x-y plane 26 independent of each other.

Figure 23:
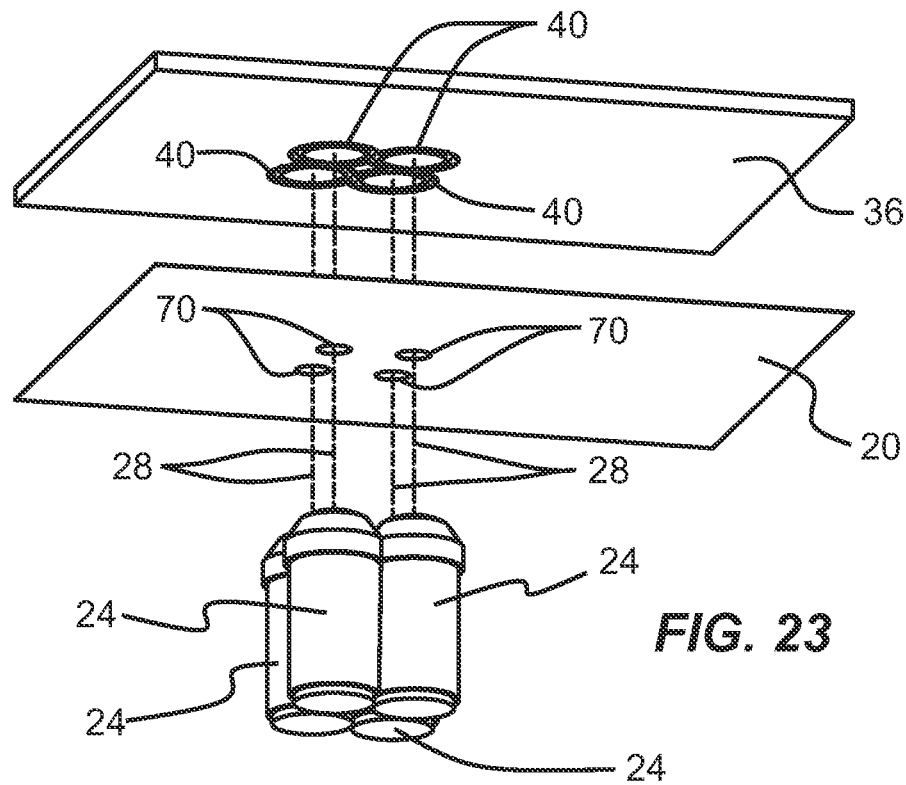
FIG. 23 shows a plurality of objective embodiments being used to image a plurality of corresponding specimens with a plurality of corresponding light patterns being aligned with each respective objective.
Figure 24:
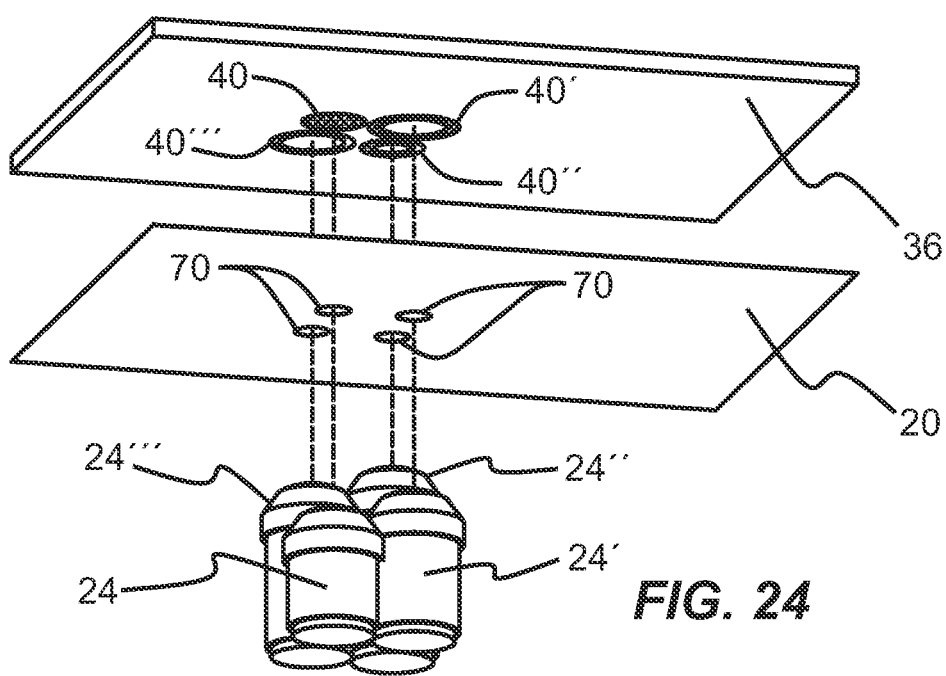
FIG. 24 shows a plurality of objective embodiments with each objective being of a different type and corresponding plurality of light patterns aligned with a respective image input axis of the objectives that may also each be different from each other and appropriate for each respective objective.
Figure 25:
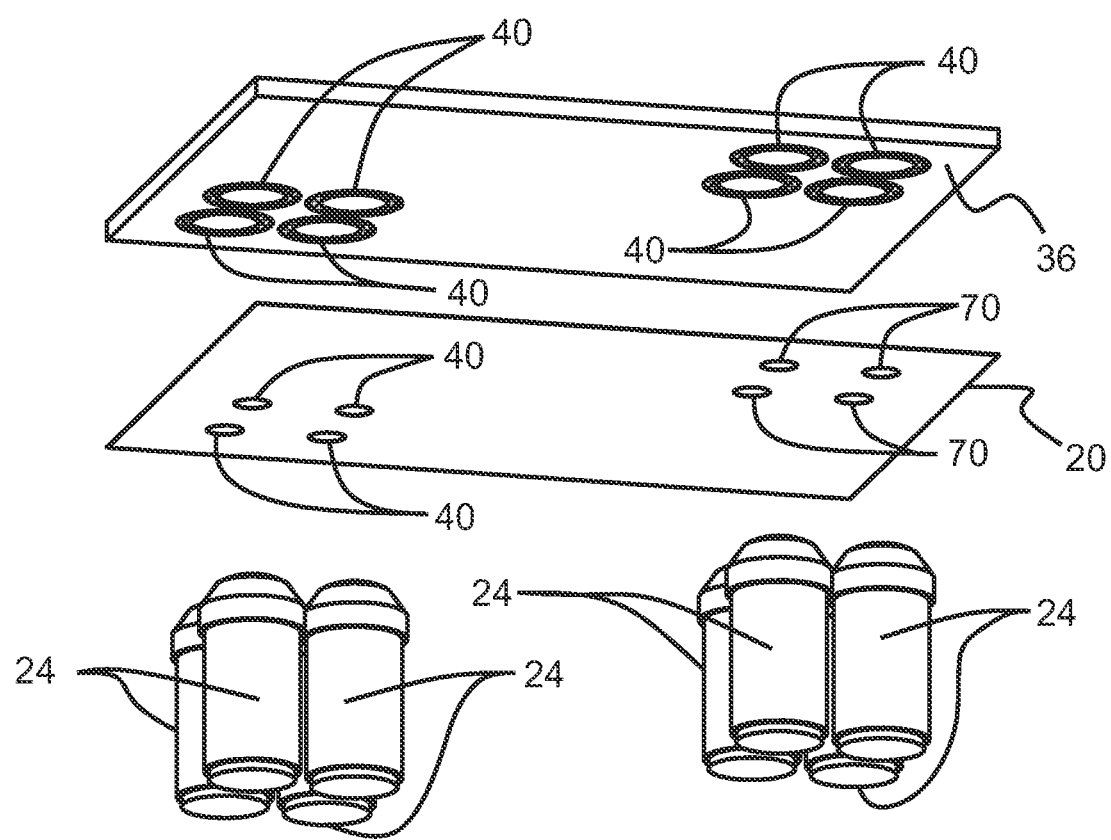
FIG. 25 shows a plurality of objective embodiments moving relative to a specimen plane and corresponding light pattern embodiments remaining aligned with the respective objectives during the movement.

Referring to FIG. 23, in some cases, a plurality of objectives 24 may be used to image a plurality of corresponding specimens 70 using a plurality of illumination light patterns 40 aligned with each respective microscope objective 24. For some embodiments, sequential illumination may be included in order to avoid interference from adjacent patterns of illumination 40. Specifically in the case of overlapping phase annulus 40 wherein the spacing of the objectives 24 may be less than the diameter of the annulus 40. In some instances, the microscope objectives 24 may be of different types, and the illumination light patterns 40, 40', 40" and 40''' shown in FIG. 24 may be different and appropriate for each respective objective 24. Illumination light patterns 40, 40', 40" and 40''' may be any shape from a pinpoint to an infinite plane which may include the entire flat illumination surface 36 of the illumination screen 32. In some cases, a plurality of objectives 24 may be moved relative to the specimen plane 20 and the corresponding illumination light patterns 40 remain aligned with the image input axes 28 of the respective objectives 24 as shown in FIG. 25.

Embodiments illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation and use of such terms and expressions do not exclude any equivalents of the features shown and described or portions thereof, and various modifications are possible. The term "a" or "an" can refer to one of or a plurality of the elements it modifies (e.g., "a reagent" can mean one or more reagents) unless it is contextually clear either one of the elements or more than one of the elements is described. Thus, it should be understood that although embodiments have been specifically disclosed by representative embodiments and optional features, modification and variation of the concepts herein disclosed may be resorted to by those skilled in the art, and such modifications and variations are considered within the scope of this disclosure.

With regard to the above detailed description, like reference numerals used therein refer to like elements that may have the same or similar dimensions, materials and configurations. While particular forms of embodiments have been illustrated and described, it will be apparent that various modifications can be made without departing from the spirit and scope of the embodiments of the invention. Accordingly, it is not intended that the invention be limited by the forgoing detailed description.

The invention claimed is:

1. A microscope imaging system, comprising:
a specimen fixture comprising an illumination side, an imaging side and at least one specimen receptacle which is disposed in a specimen plane of the specimen fixture;
a translation stage which is disposed in fixed relation to the specimen fixture and which faces the imaging side of the specimen fixture;
an objective which is operatively coupled to the translation stage, which is laterally translatable in an x-y plane that is substantially parallel to the specimen plane, and which includes an image input axis disposed towards the imaging side of the specimen fixture;
an illumination screen which is disposed in fixed relation to the specimen fixture, which faces the illumination side of the specimen fixture, and which includes a flat illumination surface that is configured to display a colored pattern having a light pattern axis; and
a controller which is operatively coupled to the illumination screen and the translation stage.

2. The microscope imaging system of claim 1 wherein the illumination screen comprises an array of vertical-cavity surface-emitting lasers.

3. The microscope imaging system of claim 1 wherein the specimen fixture comprises a plurality of specimen receptacles and the controller is configured to coordinate transmission of an illumination signal to the illumination screen which produces emission of a light pattern from the flat illumination surface which has the light pattern axis that remains aligned with the image input axis of the objective as the objective is translated in the x-y plane from a first position with the image input axis aligned with a first specimen receptacle to a second position with the image input axis aligned with a second specimen receptacle.

4. The microscope imaging system of claim 1 wherein the controller is configured to align the image input axis of the objective with the light pattern axis of a light pattern by mapping positions of the image input axis to corresponding positions on the flat illumination surface of the illumination screen.

5. The microscope imaging system of claim 3 wherein the controller is configured to generate the illumination signal and coordinate transmission of the illumination signal to the illumination screen.

6. The microscope imaging system of claim 1 further comprising a position sensor operatively coupled to the translation stage and the controller, and wherein the controller is configured to receive position information from the position sensor regarding a position of the image input axis of the objective prior to coordinating transmission of an illumination signal to the illumination screen.

7. The microscope imaging system of claim 1 wherein the translation stage further includes a carrier which is configured to translate in the x-y plane and wherein the objective is secured in fixed relation to the carrier of the translation stage.

8. The microscope imaging system of claim 1 further comprising an image sensor operatively coupled to the objective.

9. The microscope imaging system of claim 8 wherein the controller is operatively coupled to the image sensor.

10. The microscope imaging system of claim 1 wherein the light pattern axis comprises an axis of symmetry of a light pattern.

11. The microscope imaging system of claim 1 further comprising a plurality of objectives which are operatively coupled to the translation stage on the imaging side of the specimen fixture, which are laterally translatable in the x-y plane that is substantially parallel to the specimen plane, which each includes an image input axis disposed towards the imaging side of the specimen fixture and which each includes an imaging plane which is substantially perpendicular to the image input axis and that is adjusted along a z-axis to be coplanar with the specimen plane; and
an image sensor operatively coupled to each of the respective objectives of the plurality of objectives.

12. The microscope imaging system of claim 1 wherein the illumination screen comprises a liquid crystal display screen.

13. The microscope imaging system of claim 1 wherein the illumination screen comprises a plasma display screen.

14. The microscope imaging system of claim 1 wherein the illumination screen comprises about 10 to about 500 pixels per inch.

* * * * *